(12) United States Patent
Koorapaty et al.

(10) Patent No.: US 6,628,945 B1
(45) Date of Patent: *Sep. 30, 2003

(54) APPARATUS AND METHODS FOR HIGH-PENETRATION RANDOM ACCESS IN WIRELESS COMMUNICATIONS SYSTEMS

(75) Inventors: Havish Koorapaty, Cary, NC (US); Rajaram Ramesh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/295,180

(22) Filed: Apr. 20, 1999

(51) Int. Cl.$^7$ ................................. H04Q 7/20

(52) U.S. Cl. ............ 455/434; 455/435; 455/450; 455/511; 455/509; 370/337; 370/347; 370/207; 370/462; 370/524

(58) Field of Search ............... 455/434, 435, 455/511, 553, 509, 450, 406, 445, 452, 453; 370/337, 347, 207, 252, 328, 329, 345, 442, 348–350, 443, 458, 462, 473, 524; 714/752, 776, 786

(56) References Cited

U.S. PATENT DOCUMENTS

| | | | |
|---|---|---|---|
| 4,446,903 A | 5/1984 | Sewerinson | 371/68 |
| 4,495,619 A | 1/1985 | Acampora | 370/104 |
| 4,868,758 A | 9/1989 | Kokubu | 705/400 |

(List continued on next page.)

FOREIGN PATENT DOCUMENTS

| | | |
|---|---|---|
| EP | 0 817 397 A1 | 1/1998 |
| EP | 0 838 964 A2 | 4/1998 |
| WO | WO 98/31165 | 7/1998 |
| WO | WO 98/33346 | 7/1998 |

OTHER PUBLICATIONS

Matthews, Adrian, "Application of IS–136 to Personal Communication Services," IEEE, Publication Date: Apr. 30, 1996, pp. 223–228.
International Search Report, PCT/US00/07105, Jul. 6, 2000.
International Search Report, PCT/US00/08279, Aug. 1, 2000.

(List continued on next page.)

Primary Examiner—Nguyen T. Vo
Assistant Examiner—Sujatha Sharma
(74) Attorney, Agent, or Firm—Myers Bigel Sibley & Sajovec

(57) ABSTRACT

Access is provided in a wireless communications system including at least one base station operative to communicate with one or more terminals over a forward control channel and a reverse control channel. A high-penetration channel reservation status is transmitted indicator from a base station in a plurality of slots assigned to a high-penetration forward control channel, such that the high-penetration channel reservation status indicator has a redundancy greater than that of a channel reservation status indicator transmitted over the forward control channel. Transmission of the high-penetration channel reservation status may be preceded by transmission of a high-penetration access request from a terminal in a plurality of slots assigned to a high-penetration reverse control channel, such that the high-penetration access request has a redundancy greater than that of an access request transmitted over the reverse control channel, and reception of the high-penetration access request at the base station. The high-penetration channel reservation status indicator may be transmitted responsive to receipt of the high-penetration access request. The channel reservation status information is coded according to an error correction code, preferably a combination of a convolutional code and a block code. According to another aspect, high-penetration hyperframe/superframe structures are utilized. Related base station and terminal apparatus are also discussed.

65 Claims, 14 Drawing Sheets

U.S. PATENT DOCUMENTS

| | | | | |
|---|---|---|---|---|
| 5,065,393 | A | | 11/1991 | Sibbitt et al. ................ 370/360 |
| 5,204,874 | A | | 4/1993 | Falconer et al. ............ 375/200 |
| 5,303,297 | A | | 4/1994 | Hillis ......................... 455/406 |
| 5,313,653 | A | | 5/1994 | Sasuta ......................... 455/17 |
| 5,341,401 | A | | 8/1994 | Farjh et al. .................... 375/94 |
| 5,450,453 | A | | 9/1995 | Frank ......................... 375/200 |
| 5,465,398 | A | | 11/1995 | Flammer ..................... 455/69 |
| 5,608,446 | A | | 3/1997 | Carr et al. ...................... 348/6 |
| 5,612,948 | A | | 3/1997 | Fette et al. ................. 379/252 |
| 5,621,737 | A | | 4/1997 | Bucher ....................... 371/5.1 |
| 5,625,877 | A | | 4/1997 | Dunn et al. ................. 455/454 |
| 5,657,325 | A | | 8/1997 | Lou et al. ................... 370/334 |
| 5,664,006 | A | | 9/1997 | Monte et al. ............... 455/405 |
| 5,666,649 | A | | 9/1997 | Dent ........................... 455/445 |
| 5,751,799 | A | | 5/1998 | Mori ........................... 379/114 |
| 5,754,599 | A | | 5/1998 | Ling et al. .................. 375/340 |
| 5,828,737 | A | | 10/1998 | Sawyer ....................... 379/114 |
| 5,884,170 | A | * | 3/1999 | Valentine et al. ........... 455/433 |
| 5,898,736 | A | | 4/1999 | Saito et al. ................. 375/316 |
| 5,909,434 | A | | 6/1999 | Odenwalder et al. ....... 370/342 |
| 5,946,356 | A | * | 8/1999 | Felix et al. ................. 375/295 |
| 5,946,670 | A | | 8/1999 | Motohashi et al. ......... 705/400 |
| 5,966,384 | A | | 10/1999 | Felix et al. ................. 370/465 |
| 5,987,076 | A | | 11/1999 | Zehavi et al. ................ 375/340 |
| 6,097,937 | A | | 8/2000 | Sawyer ....................... 455/406 |
| 6,148,208 | A | | 11/2000 | Love ........................... 455/442 |
| 6,154,643 | A | * | 11/2000 | Cox ............................. 455/406 |
| 6,188,885 | B1 | | 2/2001 | Kolev et al. ................ 455/413 |
| 6,212,176 | B1 | * | 4/2001 | Andersson et al. ......... 370/347 |
| 6,320,843 | B1 | * | 11/2001 | Rydbeck et al. ............ 370/207 |
| 6,324,395 | B1 | * | 11/2001 | Khayrallah et al. ......... 455/406 |
| 6,405,039 | B1 | * | 6/2002 | Koorapaty et al. ......... 455/434 |

OTHER PUBLICATIONS

International Search Report, PCT/US99/21463, Feb. 21, 2000.

W.T. Webb, "QAM: the modulation scheme for future mobile radio communications?," Electronics & Communication Journal, Aug. 1992, No. 4, pp. 167–176.

Guiliano Benelli, "Two New Coding Techniques for Diversity Communication Systems," IEEE Transactions on Communications, Sep. 1990, No. 9, pp. 1530–1538.

International Search Report, PCT/US99,21128, Jan. 17, 2000.

* cited by examiner

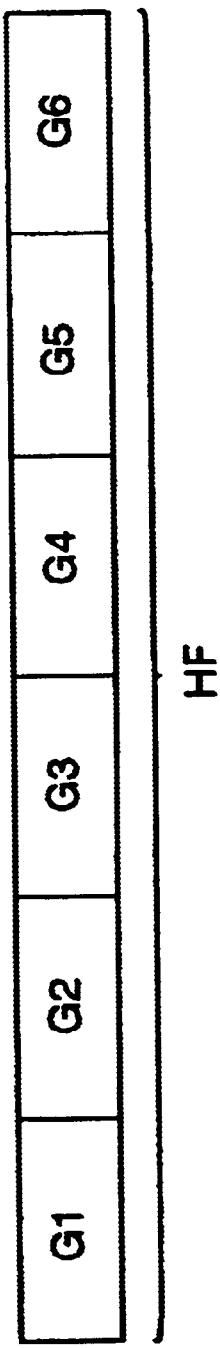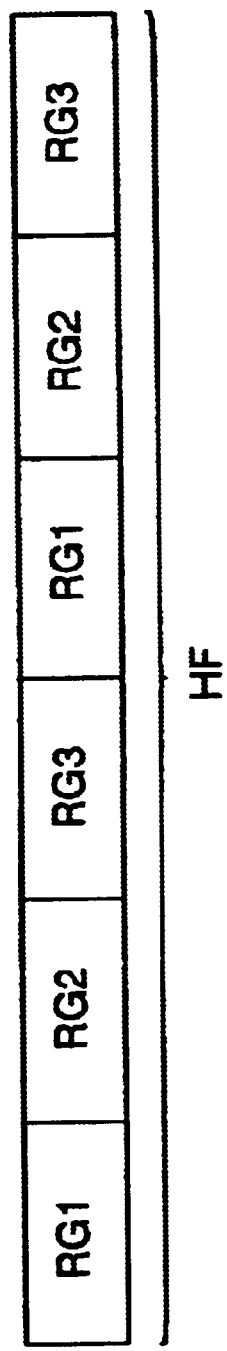

APPARATUS AND METHODS FOR HIGH-PENETRATION RANDOM ACCESS IN WIRELESS COMMUNICATIONS SYSTEMS

FIELD OF THE INVENTION

The present invention relates to wireless communications systems and methods, and more particularly, to systems and methods for providing access in wireless communication systems.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have been long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a conventional terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Traditional analog cellular systems generally employ a system referred to as frequency division multiple access (FDMA) to create communications channels. As a practical matter well known to those skilled in the art, radiotelephone communications signals, being modulated waveforms, typically are communicated over predetermined frequency bands in a spectrum of carrier frequencies. In a typical FDMA system, each of these discrete frequency bands serves as a channel over which cellular radiotelephones communicate with a cell, through the base station or satellite serving the cell.

The limitations on the available frequency spectrum present several challenges as the number of subscribers increases. Increasing the number of subscribers in a cellular radiotelephone system may require more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of channels available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system having only several hundred allocated frequency bands.

Another technique which can further increase system capacity and spectral efficiency is the use of time division multiple access (TDMA). A TDMA system may be implemented by subdividing the frequency bands employed in conventional FDMA systems into sequential time slots. Communications over a frequency band typically occur on a repetitive TDMA frame structure that includes a plurality of time slots. Examples of systems employing TDMA are those conforming to the IS-136 standard, in which each of a plurality of frequency bands are subdivided into 3 time slots, and systems conforming to the GSM standard, which divides each of a plurality of frequency bands into 8 time slots. In these TDMA systems, each user communicates with the base station using bursts of digital data transmitted during assigned time slots.

A channel in a TDMA system typically includes at least one time slot on at least one frequency band. Typically included among the channels in a TDMA system are dedicated control channels, including forward (downlink) control channels for conveying information from a base station to subscriber terminals, and reverse control channels for conveying information from subscriber terminals to a base station. The information broadcast on a forward control channel may include such things as a cell's identification, associated network identification, system timing information and other information needed to access the wireless system from a subscriber unit and to manage radio resources in the system. Reverse control channels are typically used for transmitting access requests from subscriber terminals. A channel used for this purpose may be referred to as random access channel (RACH).

An exemplary slot allocation, in particular, one utilized by wireless systems complying with the IS-136 standard, is illustrated in FIG. 3. For groups of three repeating slots on the uplink and downlink carrier frequency bands used by a base station, a "slot pair" on one pair of uplink and downlink carrier frequency bands is reserved for the provision of a forward Digital Control Channel (FDCCH), and a reverse DCCH (RDCCH), with other slots being assigned to Digital Traffic Channels (DTCs).

As illustrated in 4, the FDCCH has a plurality of "logical channels" mapped thereon, including a multiplexed Broadcast Channel (BCCH) designed to convey information about system configuration and system access rules, and a multiplexed point-to-point short message service (SMS), paging and access response channel (SPACH). The BCCH is further divided into a Fast Broadcast Channel (F-BCCH) for conveying time-critical information such as system identification (ID) and registration information, an Extended Broadcast Channel (E-BCCH) for conveying less time critical information such as neighboring cell lists, and an SMS Broadcast Channel (S-BCCH). The SPACH comprises a short message service channel (SMSCH) for carrying messages, a paging channel (PCH) for conveying system pages, and an access response channel (ARCH) for providing system response to queries from subscriber units and other administration information. The RDCCH is used to provide a Random Access Channel (RACH), which is used by terminals to transmit requests to access the wireless system.

Wireless systems typically provide access on a "contention/reservation" basis, controlled by information transmitted over FDCCHs and RDCCHs. As illustrated in FIG. 5, a Layer 1 (Physical Layer) message transmitted over the FDCCH typically is constructed from a Layer 3 message that is broken down into Layer 2 frames, a respective one of which is transmitted during a respective slot after convolutional coding and interleaving. Each Layer 1 FDCCH message includes coded Layer 3 data, along with a synchronization information (SYNC) field and a Coded Superframe Phase (CSFP) field that indicates the position of the FDCCH slot in a Superframe.

The FDCCH message also includes a Shared Channel Feedback (SCF) field that contains information about the reservation status of an associated RDCCH RACH. The reservation status information in SCF field includes a Busy/Reserved/Idle (BRI) field that indicates whether the corresponding RDCCH RACH is busy, reserved or idle. A Received/Not Received (R/N) field indicates whether a RACH burst was received on the corresponding RACH. A Coded Partial Echo (CPE) field may be used to identify a terminal for which a RACH burst has been successfully received.

The SCF may be utilized to control system access as follows. A mobile terminal seeking contention-based access "listens" to the FDCCH, examining the SCF BRI fields to find an available RDCCH RACH slot that is not reserved or currently in use by another terminal. Once a suitable slot is found, the mobile terminal transmits a RACH burst in the appropriate slot. Assuming that the base station receives the RACH burst and there is no contention from another terminal, the base station acknowledges receipt of the RACH burst in the SCF field of the next corresponding FDCCH slot. A mobile terminal can make a reservation-based access at the discretion of the base station, i.e., the base station transmits an FDCCH burst having an SCF field that indicates that a particular RACH slot is reserved for the mobile terminal, e.g., by setting the BRI field to "Idle" and including the seven least significant bits of the mobile terminal's MSID in the CPE field.

Wireless communications systems are often subject to environmental effects that can render system access difficult. A wireless call which could be placed under system operating parameters that are designed to produce an acceptable level of communications quality under a set of nominal environmental conditions, may not be possible under "subnominal" conditions of fading, shadowing by intervening objects such as hills, and attenuation by distance and by structures such as buildings.

High-penetration messaging and paging solutions have been proposed that allow a base station to transmit a short alphanumeric message to a terminal in a disadvantaged location, such as in a "hole" between coverage areas or within a building or tunnel, using a high-penetration control channel. In response to the receipt of such a high-penetration short message, the mobile terminal can transmit a similar high-penetration acknowledgment, and later move to a less disadvantaged location and call back the calling party identified in the short message. Examples of high-penetration messaging services are described in U.S. patent application Ser. No. 09/193,261 (Rydbeck et al., filed Nov. 18, 1998) and U.S. patent application Ser. No. 09/195,790 (Rydbeck et al., filed Nov. 18, 1998), both of which are assigned to the assignee of the present invention. Although such HP-SMS services can provide valuable additional services, they generally provide only limited functionality because they generally do not provide the subscriber with full access to the wireless system.

SUMMARY OF THE INVENTION

In light of the foregoing, it is an object of the present invention to provide improved systems and methods for accessing a wireless communications system.

It is another object of the present invention to provide systems and methods for accessing a wireless communications system under disadvantaged radio propagation conditions.

These and other objects, features and advantages are provided according to the present invention by systems and methods in which a base station transmits a high-penetration channel reservation status indicator in a plurality of slots assigned to a high-penetration forward control channel responsive, for example, to receipt of a high-penetration access request transmitted from a terminal in a plurality of slots assigned to a high-penetration reverse control channel. The high-penetration channel reservation status indicator preferably comprises channel reservation status information that is coded according to an error correction code, more preferably a block code. For example, respective block code words representing channel reservation status information may be transmitted in respective Shared Channel Feedback (SCF) fields of a plurality of high-penetration forward Digital Control Channel (HP-FDCCH) slots. In this manner, access can be provided for terminals in disadvantaged locations while retaining message formats and protocols used for normal access. According to other aspects of the present invention, high-penetration hyperframe/superframe structures are used that group high-penetration subchannels such that an access request or a channel reservation indication is transmitted over a time period greater than the duration of a high-penetration superframe and less than the duration of a high-penetration hyperframe. These structures can gain the advantage of time diversity without incurring inordinately long message delays.

According to an aspect of the present invention, access is provided to a wireless communications system including at least one base station operative to communicate with one or more terminals over a forward control channel and a reverse control channel. A high-penetration channel reservation status is transmitted indicator from a base station in a plurality of slots assigned to a high-penetration forward control channel, such that the high-penetration channel reservation status indicator has a redundancy greater than that of a channel reservation status indicator transmitted over the forward control channel. Transmission of the high-penetration channel reservation status may be preceded by transmission of a high-penetration access request from a terminal in a plurality of slots assigned to a high-penetration reverse control channel, such that the high-penetration access request has a redundancy greater than that of an access request transmitted over the reverse control channel, and reception of the high-penetration access request at the base station. The high-penetration channel reservation status indicator may be transmitted responsive to receipt of the high-penetration access request.

According to another aspect of the present invention, channel reservation status information is coded according to an error correction code. A high-penetration channel reservation status indicator is transmitted by transmitting the error correction coded channel reservation status information. The error correction code may comprise a combination of a convolutional code and a block code.

According to other aspects of the present invention, high-penetration hyperframe/superframe structures are utilized. Respective successive groups of slots of a first physical channel are assigned to respective groups of high-penetration reverse control subchannels. Respective successive groups of slots of a second physical channel are assigned to respective groups of high-penetration forward control subchannels. A high-penetration access request is transmitted as a plurality of bursts in slots assigned to one of the high-penetration reverse control subchannels. A high-penetration channel reservation status indicator is transmitted as a plurality of burst in slots assigned to a corresponding one of the high-penetration forward control subchannels. Slots of a group of the groups of slots of the first physical channel may be assigned to high-penetration reverse subchannels in repeating sets of high-penetration reverse subchannel slots, and slots of a group of the groups of slots of the second physical channel may be assigned to high-penetration forward subchannels in repeating sets of high-penetration forward subchannel slots. A high-penetration reverse control channel hyperframe is defined, comprising a plurality of high-penetration reverse control channel superframes, a respective one of which includes a respective plurality of the repeating sets of high-penetration reverse subchannel slots. A high-penetration forward control channel hyperframe is defined, comprising a plurality of high-penetration forward control channel superframes, a respective one of which includes a respective plurality of the repeating sets of high-penetration forward subchannel slots, interleaved with slots reserved for synchronization bursts. A high-penetration access request is transmitted as a series of bursts within slots assigned to one of the high-penetration reverse control subchannels such that the access request is transmitted over a time period greater than the duration of one of the high-penetration reverse control channel superframes and less than the duration of the high-penetration reverse control channel hyperframe. A high-penetration channel reservation status indicator is transmitted as a series of bursts within slots assigned to one of the high-penetration forward control subchannels such that the channel reservation status indicator is transmitted within a time period greater than the duration of one of the high-penetration forward control channel superframes and less than the duration of the high-penetration forward control channel hyperframe.

In an embodiment according to the present invention, a base station is provided for communicating with terminals over a forward control channel and a reverse control channel. The base station includes a receiver operative to receive an access request in a slot assigned to the reverse control channel and to receive a high-penetration access request from a terminal in a plurality of slots assigned to a high-penetration reverse control channel, such that the high-penetration access request has a redundancy greater than that of an access request transmitted over the reverse control channel. The base station also includes a transmitter operative to transmit a channel reservation status indicator in a slot assigned to the forward control channel and to transmit a high-penetration channel reservation status indicator in a plurality of slots assigned to a high-penetration forward control channel, such that the high-penetration channel reservation status indicator has a redundancy greater than that of a channel reservation status indicator transmitted over the forward control channel.

In another embodiment according to the present invention, a terminal is operative to communicate with a base station over a forward control channel and a reverse control channel. The terminal includes a receiver operative to receive a channel reservation status indicator in a slot assigned to the forward control channel and to receive a high-penetration channel reservation status indicator in a plurality of slots assigned to a high-penetration forward control channel, such that the high-penetration channel reservation status indicator has a redundancy greater than that of a channel reservation status indicator received over the forward control channel. The terminal also includes a transmitter operative to transmit an access request in a slot assigned to the reverse control channel and to transmit a high-penetration access request in a plurality of slots assigned to a high-penetration reverse control channel, such that the high-penetration access request has a redundancy greater than that of an access request transmitted over the reverse control channel.

BRIEF DESCRIPTION OF THE DRAWINGS

FIGS. 11A–11B and 12A–12B illustrate respective exemplary superframe/hyperframe structures for high-penetration forward and reverse control channels according to embodiments of the present invention.

DETAILED DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

It will be understood that although the embodiments described herein relate to time division multiple access (TDMA) wireless communications systems such as systems complying with the IS-136 standards, the methods and apparatus of the present invention are also applicable to other systems. For example, high-penetration random access techniques according to the present invention may be also be applicable to code division multiple access (CDMA) systems.

Figure 1:
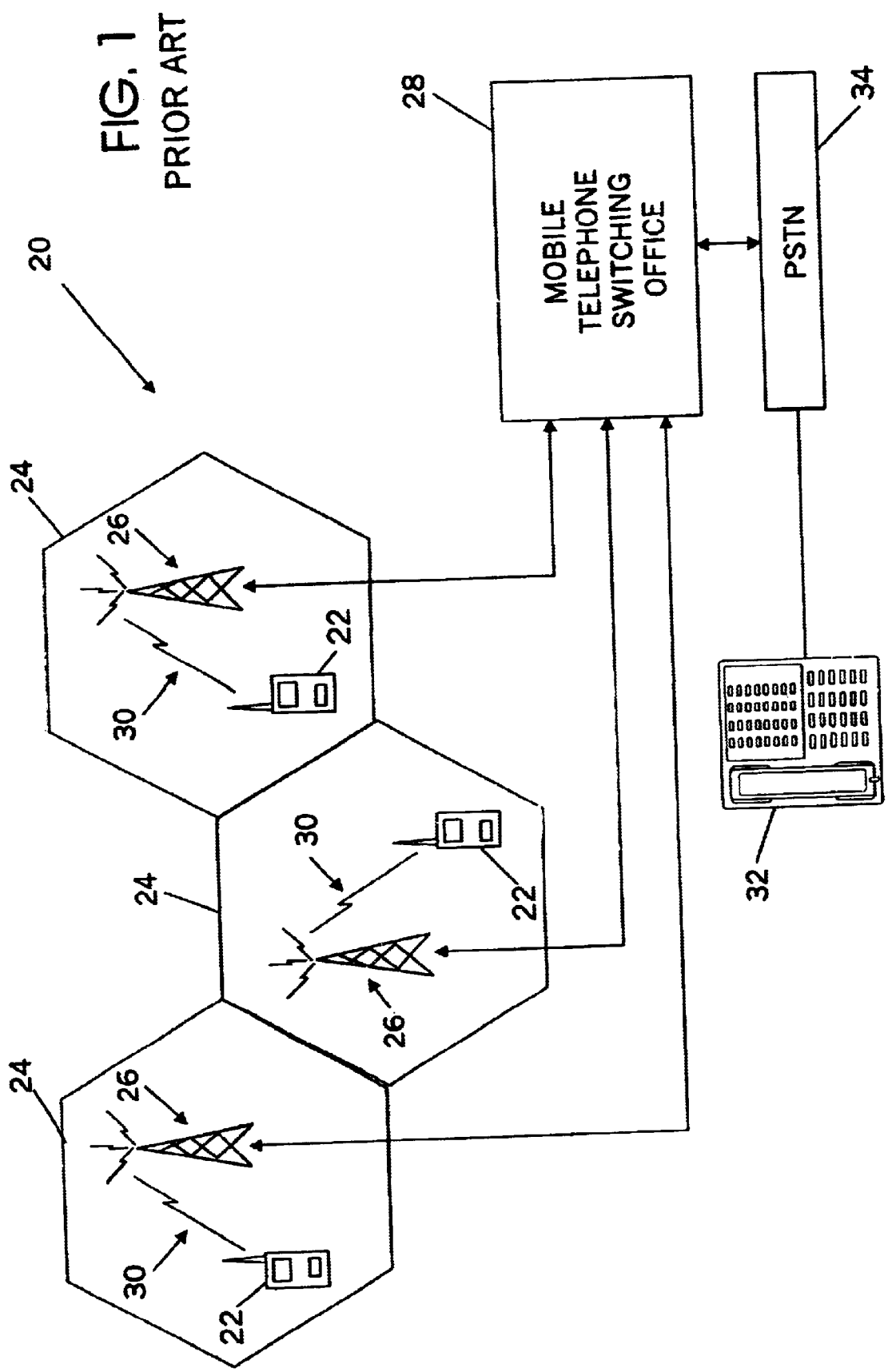
FIG. 1 illustrates a terrestrial wireless communications system according to the prior art.
Figure 2:
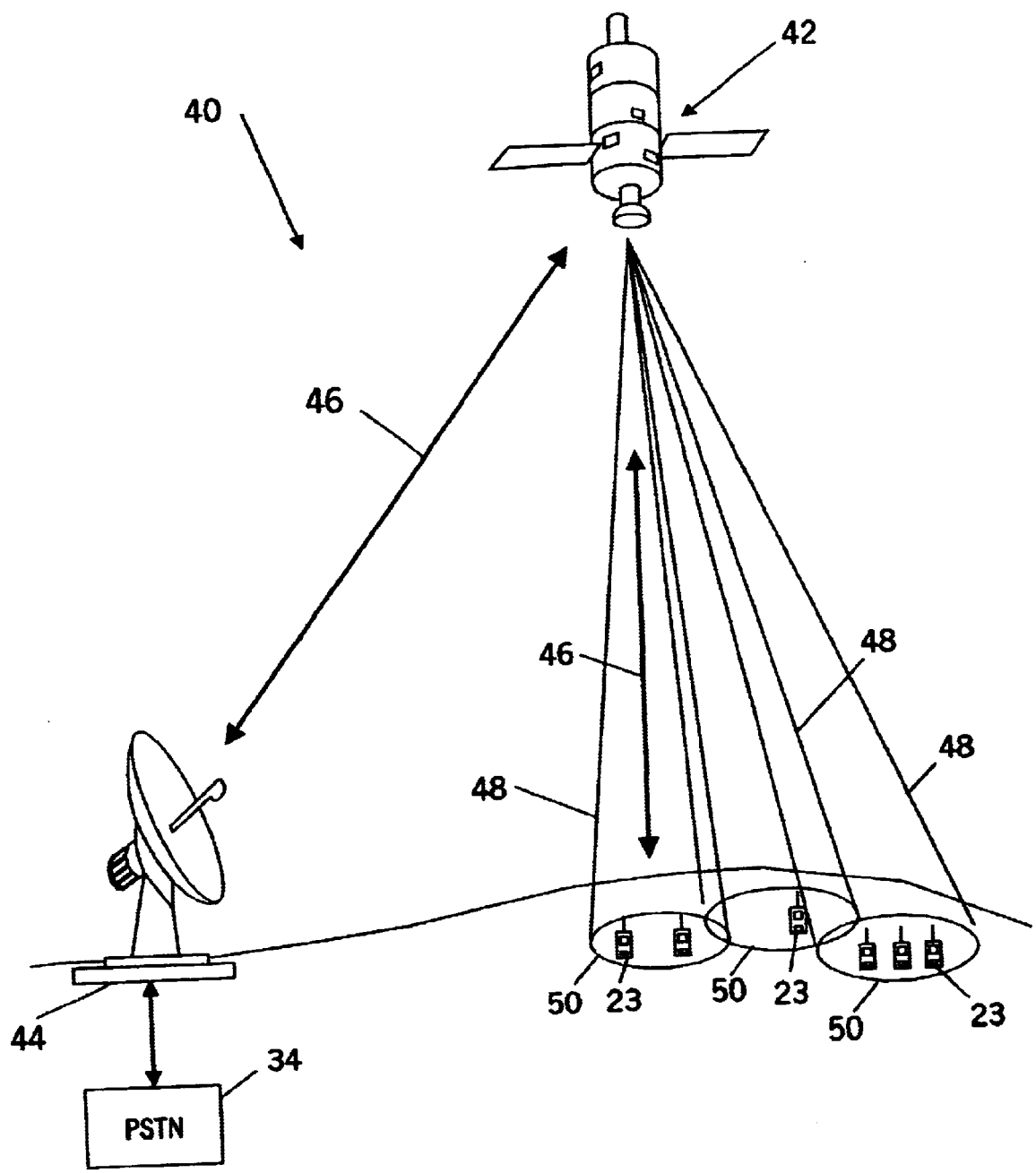
FIG. 2 illustrates a satellite-based wireless communications system according to the prior art.
Figure 3:
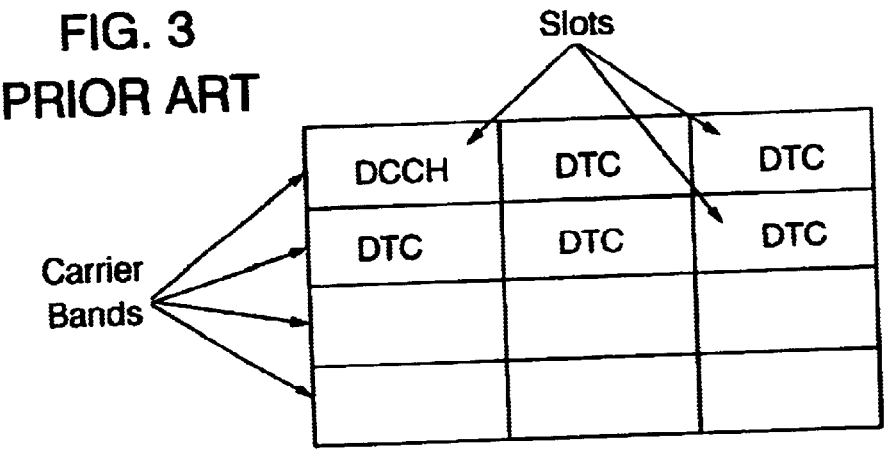
FIG. 3 illustrates physical channel assignment for a time division multiple access (TDMA) wireless communications system according to the prior art.
Figure 4:
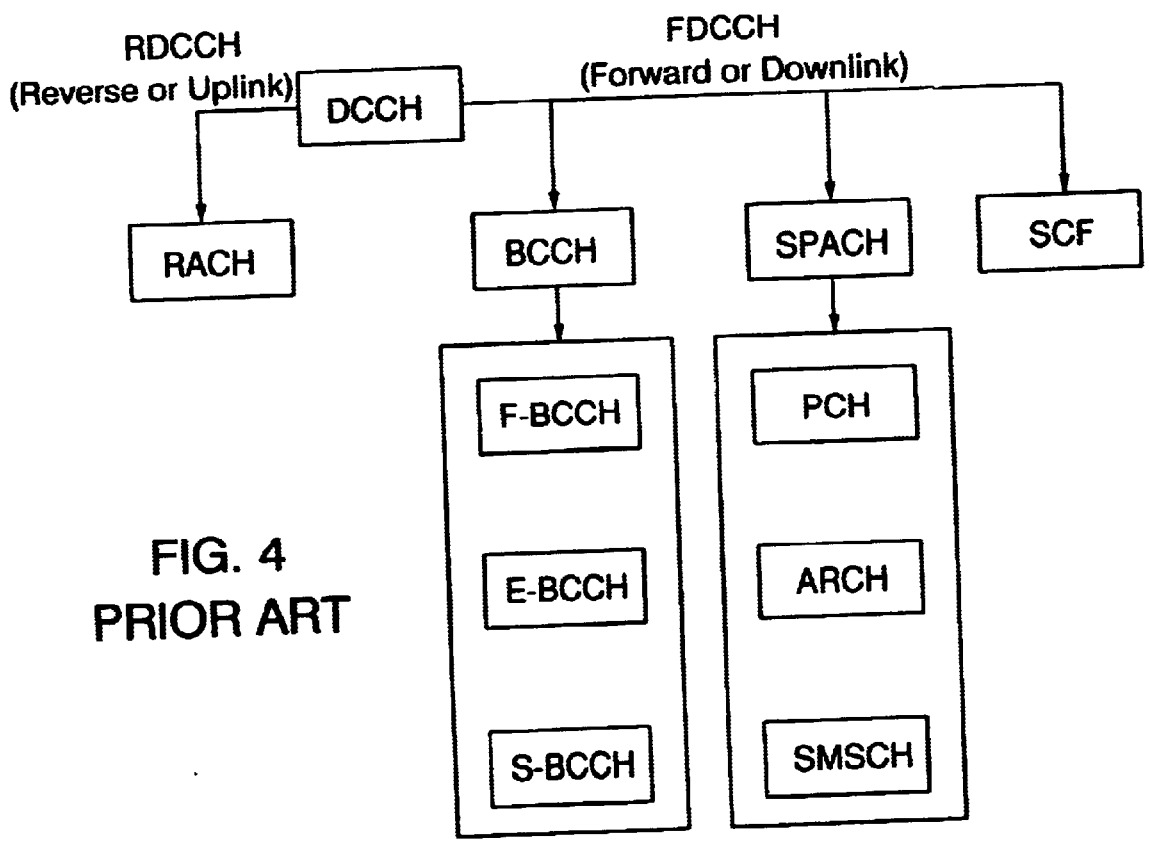
FIG. 4 illustrates logical control channel assignments for a wireless communications system according to the prior art.
Figure 5:
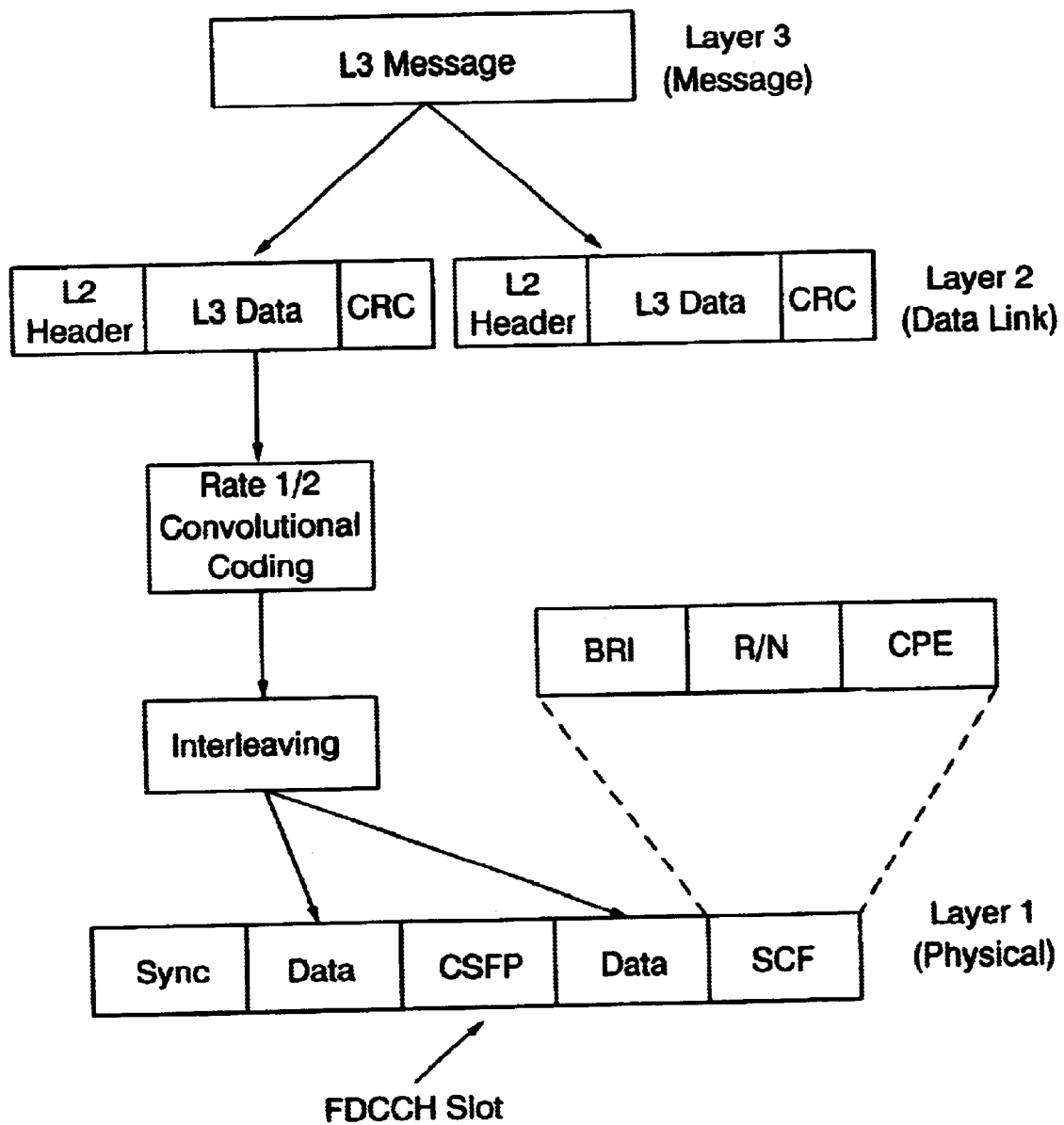
FIG. 5 illustrates a protocol stack for a Forward Digital Control Channel (FDCCH) according to the prior art.
Figure 6:
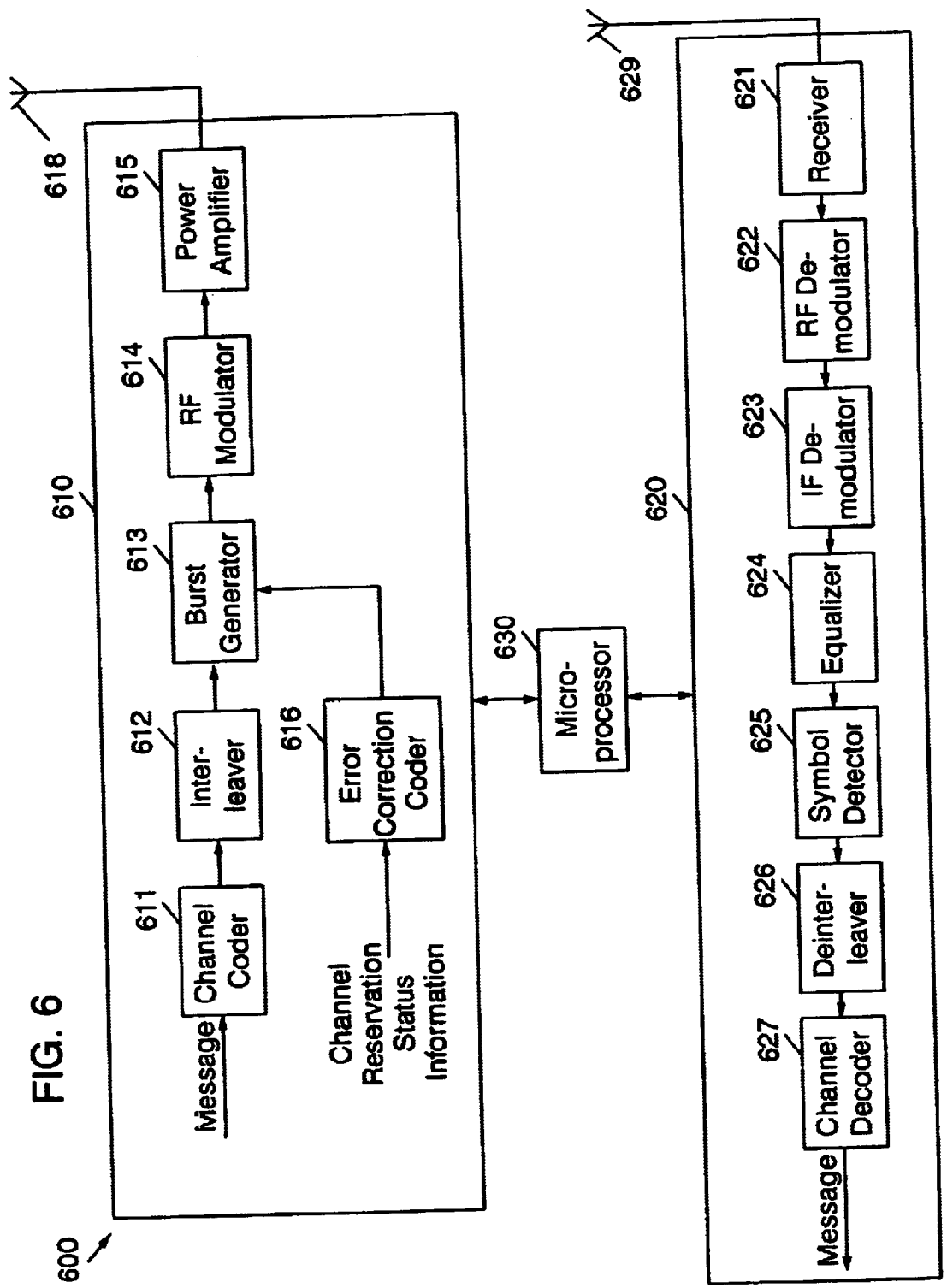
FIGS. 6 and 7 illustrate exemplary transceiver apparatus according to embodiments of the present invention.

FIG. 6 illustrates a transceiver 600 in which methods and apparatus of the present invention can be embodied. The transceiver 600 may be utilized in a base station such as the base stations 26 illustrated in FIG. 1 or a satellite base station such as the satellite base station 42 illustrated in FIG. 2 to receive access requests and responsively transmit channel reservation status information over a high-penetration reverse and forward control channels. A receiver section 620 recovers access requests from radio signals received from an antenna 629 over a plurality of slots assigned to a reverse control channel. The receiver section 620 includes a receiver 621 that receives radio frequency (RF) signals from the antenna 629. The received signals are passed on to an RF demodulator 622 that downconverts the carrier-modulated signal to produce an intermediate frequency signal that is further demodulated and equalized by an intermediate frequency (IF) demodulator 623 and an equalizer 624, respectively. Symbols are then detected from baseband samples produced from the equalizer 624 by a symbol detector 625. The detected symbols are then deinterleaved and decoded by a deinterleaver 626 and a channel decoder 627. The receiver 621, RF demodulator 622, IF demodulator 623, equalizer 624, symbol detector 625, deinterleaver 626, and channel decoder 627 are operatively associated with a microprocessor 630 or similar device for control and other functions.

A transmitter section 610 processes an input message, e.g., a Layer 2 frame, and transmits corresponding radio frequency bursts in a plurality of slots assigned to a high-penetration forward control channel. The transmitter section 610 includes a channel coder 611 that encodes the message according to an error correction code, followed by an interleaver 612 that interleaves the coded message data. The coded and interleaved data is then fed to a burst generator 613, where synchronization information is added, along with coded reservation status information produced by an error correction coder 616, e.g., a coder which applies a combination of a convolutional code and a block code as described in greater detail below. The reservation status information may, for example, include information identifying a terminal from which an access request burst has been received by the receiving section 620. The formatted bursts are passed to an RF modulator 614 in which the data is modulated by a radio frequency carrier. The modulated signal is then amplified by a power amplifier 615 and transmitted by a radio antenna 618. The channel coder 611, interleaver 612, burst generator 613, RF modulator 614, power amplifier 615 and error correction coder 616 are operatively associated with the microprocessor 630 for control and other functions.

Figure 7:
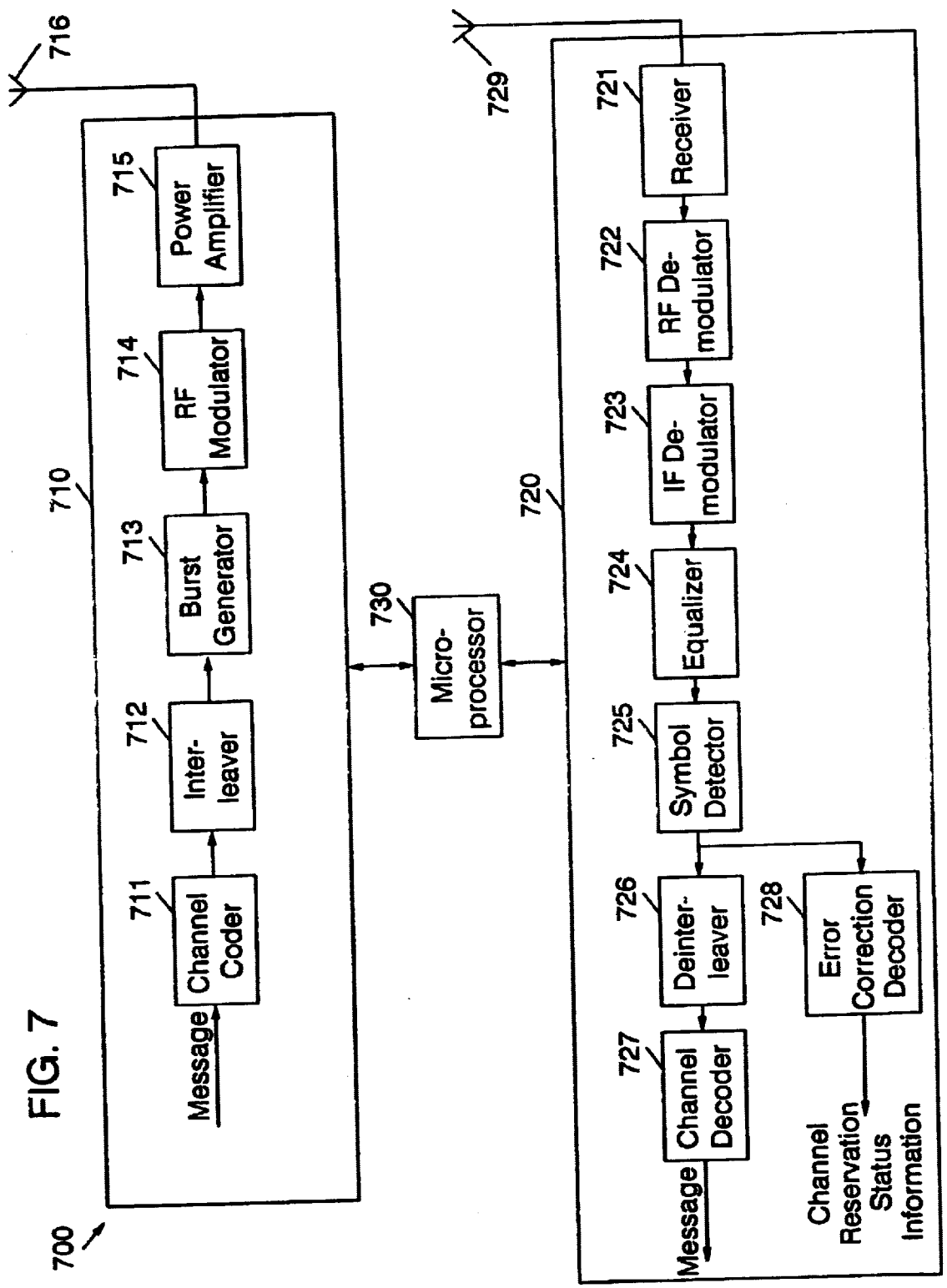

FIG. 7 illustrates a transceiver 700 in which methods and apparatus of the present invention can be embodied. The transceiver 700 may be utilized in a mobile or other terminal, such as the terminals 22, 23 of FIGS. 1 and 2, to transmit access requests and/or other messages, such as alphanumeric short messages, and to receive channel reservation status information and/or other messages, over high-penetration forward and reverse control channels. A receiver section 720 recovers channel reservation status information from radio signals received from an antenna 729 over a plurality of slots assigned to a reverse control channel. The receiver section 720 includes a receiver 721 that receives radio frequency signals from the antenna 729. The received signals are passed on to an radio frequency (RF) demodulator 722 that downconverts the carrier-modulated signal to produce an intermediate frequency signal that is further demodulated and equalized by an IF demodulator 723 and an equalizer 724, respectively. Symbols are then detected from baseband samples by a symbol detector 725. Detected symbols corresponding to a transmitted message are deinterleaved and decoded by a deinterleaver 726 and a channel decoder 727, respectively. Detected symbols corresponding to error correction coded channel reservation information are separately decoded in an error correction decoder 728. The receiver 721, RF demodulator 722, IF demodulator 723, equalizer 724, symbol detector 725, deinterleaver 726, channel decoder 727, and error correction decoder 728 are operatively associated with a microprocessor 730 for control and other functions.

A transmitter section 710 processes an input message, e.g., a Layer 2 access request message, and transmits corresponding radio frequency bursts in a plurality of slots assigned to a high-penetration reverse control channel. The transmitter section 710 includes a channel coder 711 that encodes the message according to an error correction code, followed by an interleaver 712 that interleaves the coded message data. The coded and interleaved data is then fed to a burst generator 713, where synchronization and other information is added. The formatted bursts are passed to an RF modulator 714 in which the data is modulated by a radio frequency carrier. The modulated signal is then amplified by a power amplifier 715 and transmitted by a radio antenna 716. The channel coder 711, interleaver 712, burst generator 713, RF modulator 714, and power amplifier 715 are operatively associated with the microprocessor 730 for control and other functions.

Those skilled in the art will appreciate that the components illustrated in FIGS. 6 and 7 may, in general, be implemented using special purpose hardware, software or firmware executing on general or special purpose hardware, and combinations thereof. Those skilled in the art will appreciate that, in addition to providing apparatus for transmitting and receiving high-penetration channel reservation status indicators and access requests, components of the transceivers 600, 700 may also be used for transmitting and receiving "regular" channel reservation status indicators and access requests. For example, the transceivers 600, 700 may by (and preferably are) used to transmit and receive "regular" FDCCH bursts (including SCF-based channel reservation status indicators) and "regular" RACH bursts as specified under IS-136 by, for example, disabling or bypassing functions of the error correction coder 616 and the error correction decoder 728. It will further be understood that, in addition to channel reservation status indicators, access response (ARCH) and other messages may also be received transmitted by the transceiver 600 or received by the transceiver 700 over a forward control channel. Similarly, in addition to access requests, alphanumberic short messages or other messages may be transmitted by the transceiver 700 and received by the transceiver 600 over a reverse control channel. It will also be understood that the receiver and transmitter architectures illustrated in FIGS. 6 and 7 are provided for exemplary purposes, and that numerous alternatives to or variations of these architectures may be used with the present invention.

Figure 8:
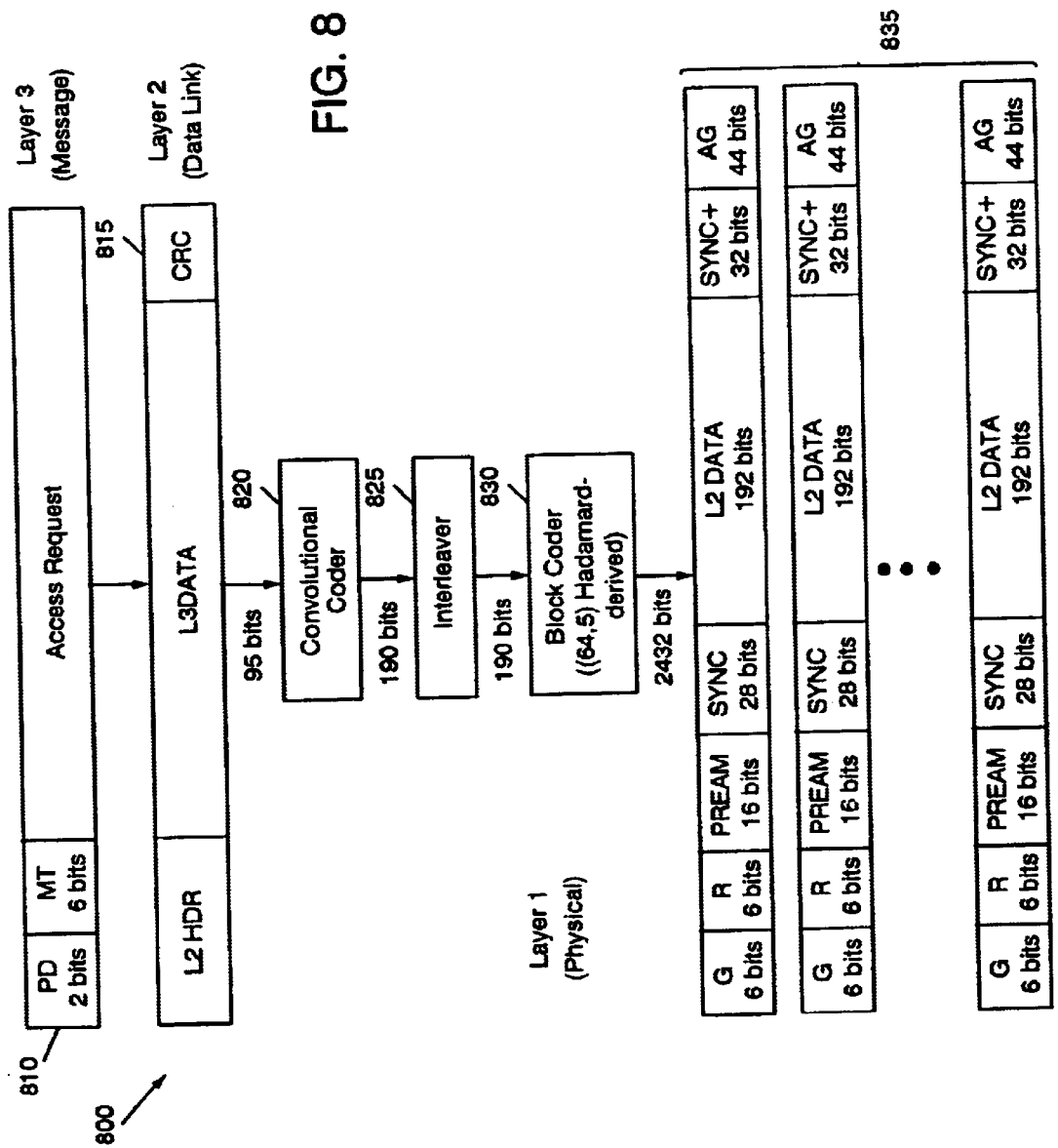
FIGS. 8 and 9 illustrate exemplary protocols for transmitting messages over high-penetration reverse and forward control channels according to embodiments of the present invention.
Figure 9:
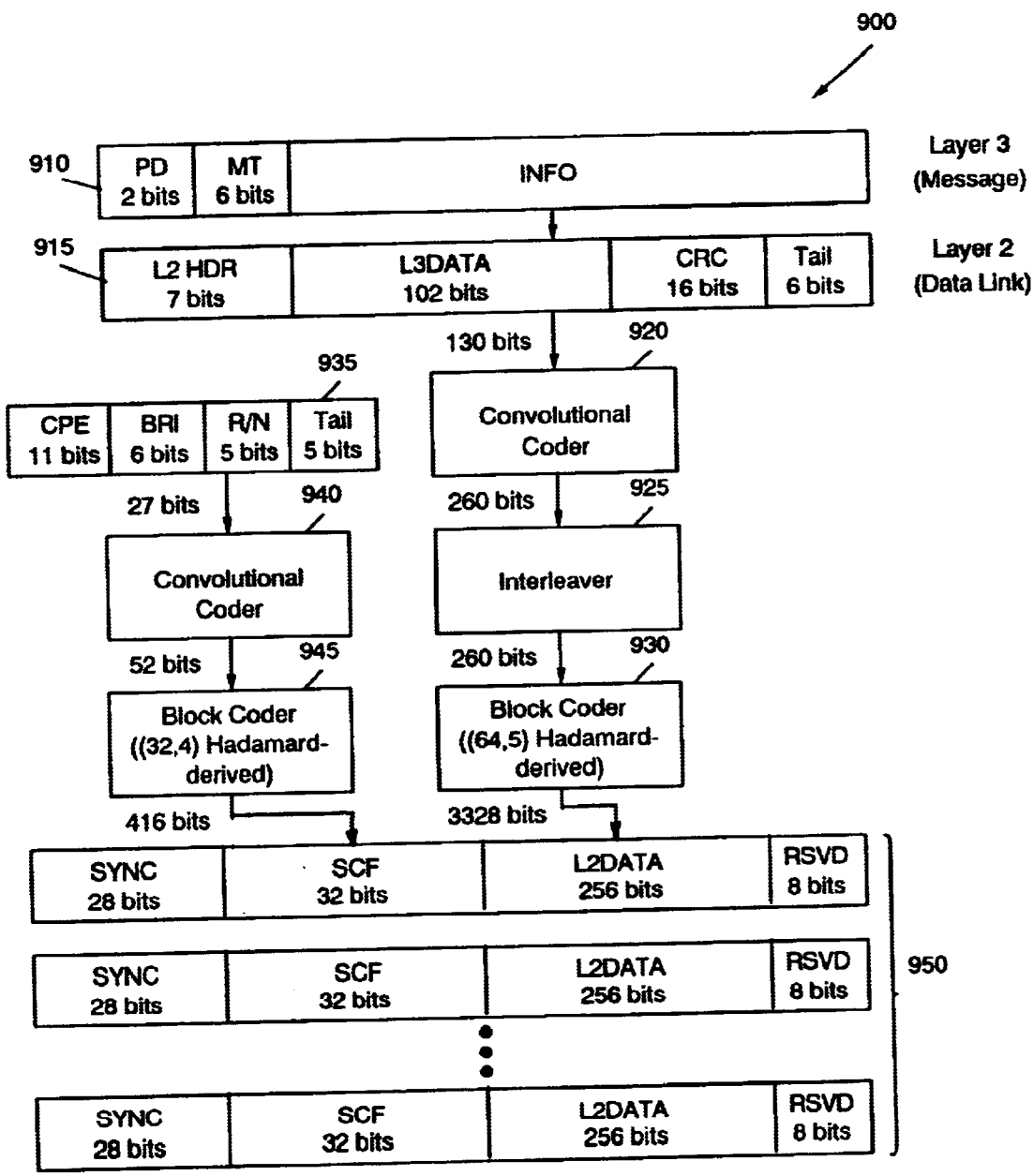
Figure 10:
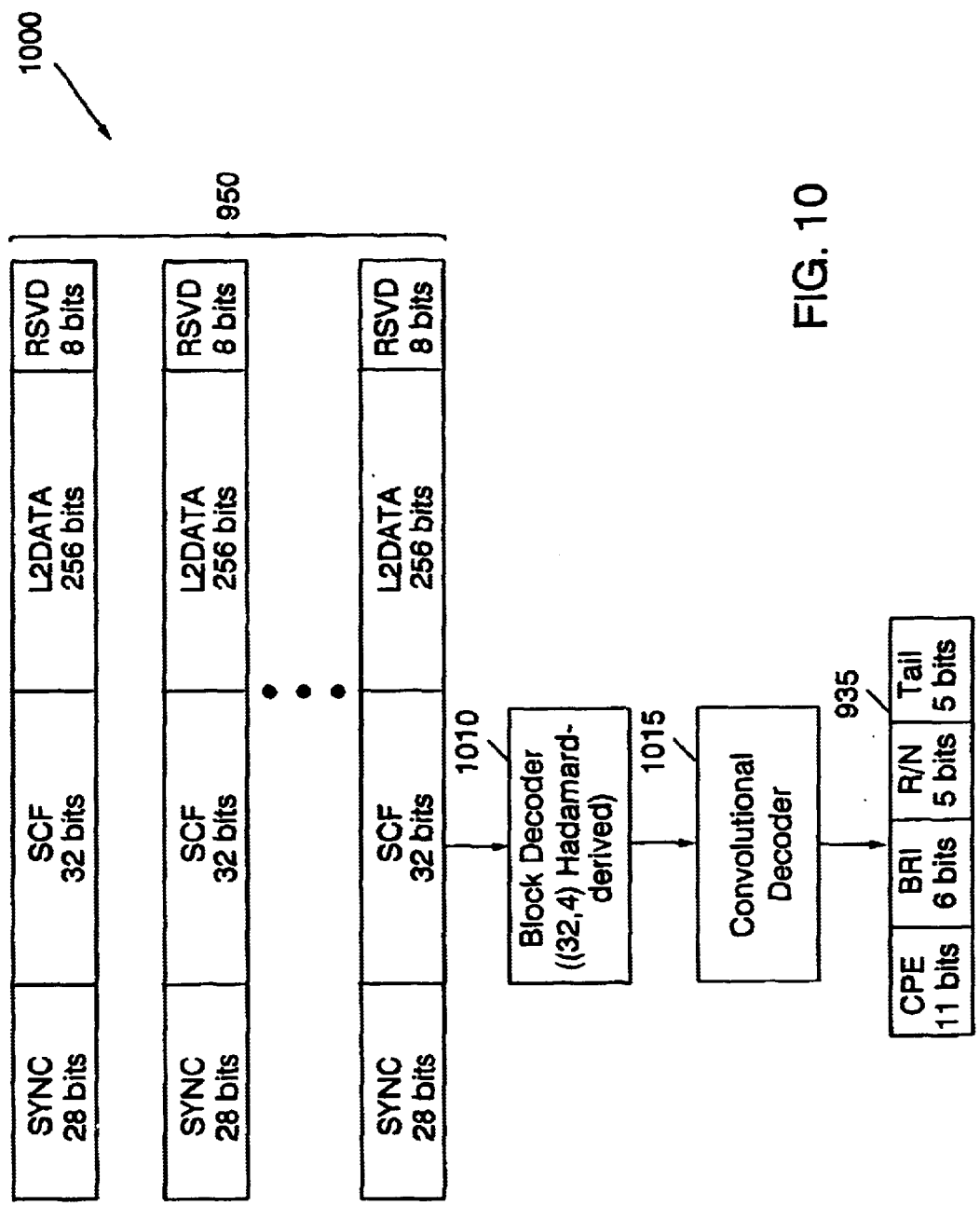
FIG. 10 illustrates an exemplary protocol for receiving message transmitted over a high-penetration forward control channel according to an embodiment of the present invention.

FIGS. 8–10 are protocol diagrams that illustrate exemplary operations for providing high-penetration random access in a wireless communications system according to aspects of the present invention. It will be generally understood that the operations illustrated in FIGS. 8–10 may be embodied in special purpose hardware, in software or firmware executing on special or general purpose hardware, and in combinations thereof, including in computer program instructions which may be loaded onto a computer or other programmable data processing apparatus to produce a machine such that the instructions which execute on the computer or other programmable data processing apparatus create means for implementing the functions specified in the flowchart block or blocks. For example, the functions of FIGS. 8–10 may be implemented as computer instructions that are loaded and executed by microprocessors such as those illustrated in FIGS. 6 and 7, positioned in wireless terminals such as the terminals 22, 24 of FIGS. 1 and 2, or in a base stations such as the base stations 26 or satellite 42 illustrated in FIGS. 1 and 2. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the protocol diagrams. Accordingly, the protocol diagrams of FIGS. 8–10 support combinations of means for performing the specified functions and combinations of steps for performing the specified functions.

FIG. 8 illustrates exemplary operations 800 for constructing Layer 1 (Physical Layer) access request bursts for transmission in a plurality of slots assigned to a high-penetration reverse control channel, more particularly, for constructing a plurality of Layer 1 access request bursts for a High-Penetration Reverse Digital Control Channel (HP-RDCCH) consistent with the IS-136 standard. A Layer 3 (Message Layer) message 810 includes an access request 812, along with a Protocol Discriminator (PD) field PD and a Message Type (MT) field MT. The Layer 3 message is included in a data field L3DATA of a Layer 2 (Data Link Layer) frame 815, which also includes Layer 2 Header L2HDR and a Cyclic Redundancy Check (CRC) value CRC. Each Layer 2 frame 815 is then processed by a rate ½, memory 5 convolutional coder 820, and then interleaved by an interleaver 825. The convolutionally coded and interleaved information is then subjected to an additional block coding in a block coder 830, preferably a (64, 5) Hadamard-type block coder, i.e., a (32, 5) Hadamard code modified by bit repetition, to produce data that is placed into data fields L2DATA of a plurality of Layer 1 messages 835. Also included in each Layer 1 message 835 are guard bit fields G, AG, a reserved field R, a Preamble field PREAM, and synchronization fields SYNC, SYNC+.

As shown, the block coder 830 maps the 190 bits of convolutionally coded and interleaved Layer 2 data into 2432 bits of block coded data (38 64-bit block code words). This additional coding can provide increased link margin for the transmitted information on the order of 10 dB. As each Layer 1 message 835 includes only 192 bits of data, each Layer 2 message 815 requires at least 13 Layer 1 messages 835, i.e., at least 13 bursts in at least 13 slots. As the IS-136 standard specifies π/4 shifted, Differentially encoded Quadrature Phase Shift Keying (π/4 DQPSK) modulation, the (64,5) Hadamard block coding 830 (corresponding to a (32,5) Hadamard code with bit repeats) maps the convolutionally coded and interleaved bits to a restricted symbol subset of the π/4 DQPSK modulation constellation. This mapping enables a receiving unit to perform noncoherent demodulation by simply applying a π/4 derotation on the phase of a transmitted symbol with respect to a previously received symbol, followed by Hadamard decoding and convolutional decoding. These concepts are described in the aforementioned U.S. patent application Ser. No. 09/193,261 (Rydbeck et al., filed Nov. 18, 1998) and U.S. patent application Ser. No. 09/195,790 (Rydbeck et al., filed Nov. 18, 1998), both of which are assigned to the assignee of the present invention and are incorporated by reference herein in their entirety.

FIG. 9 illustrates operations for constructing a plurality of control channel bursts for transmission in a plurality of slots assigned to a high-penetration forward control channel corresponding to the high-penetration reverse control channel of FIG. 8, more particular, for constructing bursts for a High-penetration Forward Digital Control Channel (HP-FCDDH) that is consistent with the IS-136 standard. A Layer 3 message 910 includes an information field INFO, along with a PD field PD and a MT field MT. The Layer 3 message 910 is included in a data field L3DATA of a Layer 2 frame 915, which also includes a header field L2HDR, a CRC value field CRC, and tail bits TAIL. Each Layer 2 frame 915 is processed by a convolutional coder 920, an interleaver 925, and a block coder 930 that preferably applies a (64,5) Hadamard code as described above. The block coder 930 maps the 260 convolutionally coded and interleaved bits of a Layer 2 frame 915 into 3328 bits, thus mapping a Layer 2 frame 915 to the 256-bit data fields L2DATA of 13 Layer 1 messages 950 that are transmitted in 13 slots assigned to the HP-FDCCH.

Along with the data field L2DATA, each Layer 1 message 950 also includes a synchronization field SYNC, a reserved field RSVD, and a 32-bit Shared Channel Feedback (SCF) field SCF. The Layer 1 messages 950 are preferably transmitted using a burst of substantially the same transmit power as a conventional FDCCH burst but, unlike a conventional IS-136 FDCCH burst, the information in the SCF field SCF is the product of an additional coding that spreads reservation status information 935 over a plurality of HP-FDCCH slots and that can provide additional link margin to improve a receiving terminal's ability to recover the reservation status information 935 under low signal to noise ratio (SNR) conditions.

The channel reservation status information 935 may be generated in the same manner and have a format similar to that of SCF data included in a "regular" FDCCH burst, i.e., may include a busy/reserved/idle field BRI, a received/not received field R/N and a coded partial echo field CPE. Before inclusion in the Layer 1 messages 950, however, the channel reservation status information 935 is convolutionally coded by a rate ½, memory 5 punctured convolutional coder 940, and then block coded according to a (32,4) Hadamard-type code (i.e., a code representing a (16,4) Hadamard code with bit repetition) in a block coder 945. The coding maps the 27 bits of the reservation status information 935 into 13 32-bit block code words (416 bits), a respective one of which is included in the SCF field SCF of a respective Layer 1 message 950. In this manner, the channel reservation status information 935 is distributed across 13 HP-FDCCH slots. As illustrated in FIG. 10, operations 1000 for processing a received plurality of Layer 1 messages or bursts 950, include decoding the SCF fields SCF of the messages 950 by a (32,4) Hadamard-type block decoder 1010 and a rate ½ convolutional decoder 1015 to recover the original channel reservation status information 935.

The DCCH under the IS-136 standard currently specifies a 32-slot superframe structure, with a hyperframe including 2 superframes. As the high-penetration forward and reverse control channels described herein are transmitted over a plurality of slots, however, such a superframe/hyperframe structure may not be particularly desirable. Although the plurality of high-penetration bursts used for transmission of a reservation status indicator or an access request message as described above can be transmitted in immediate succession, improved performance can be obtained according to an aspect of the present invention, by spacing out these bursts to take advantage of time diversity. According to another aspect of the present invention, a tradeoff between time diversity and message delay can be achieved by defining superframe and hyperframe structures for the high-penetration forward control channels and the high-penetration reverse control channels, such that an individual access request or channel status reservation indicator is transmitted over a time period greater than the duration of one of the superframes and less than the duration of the hyperframe.

Figure 11B:
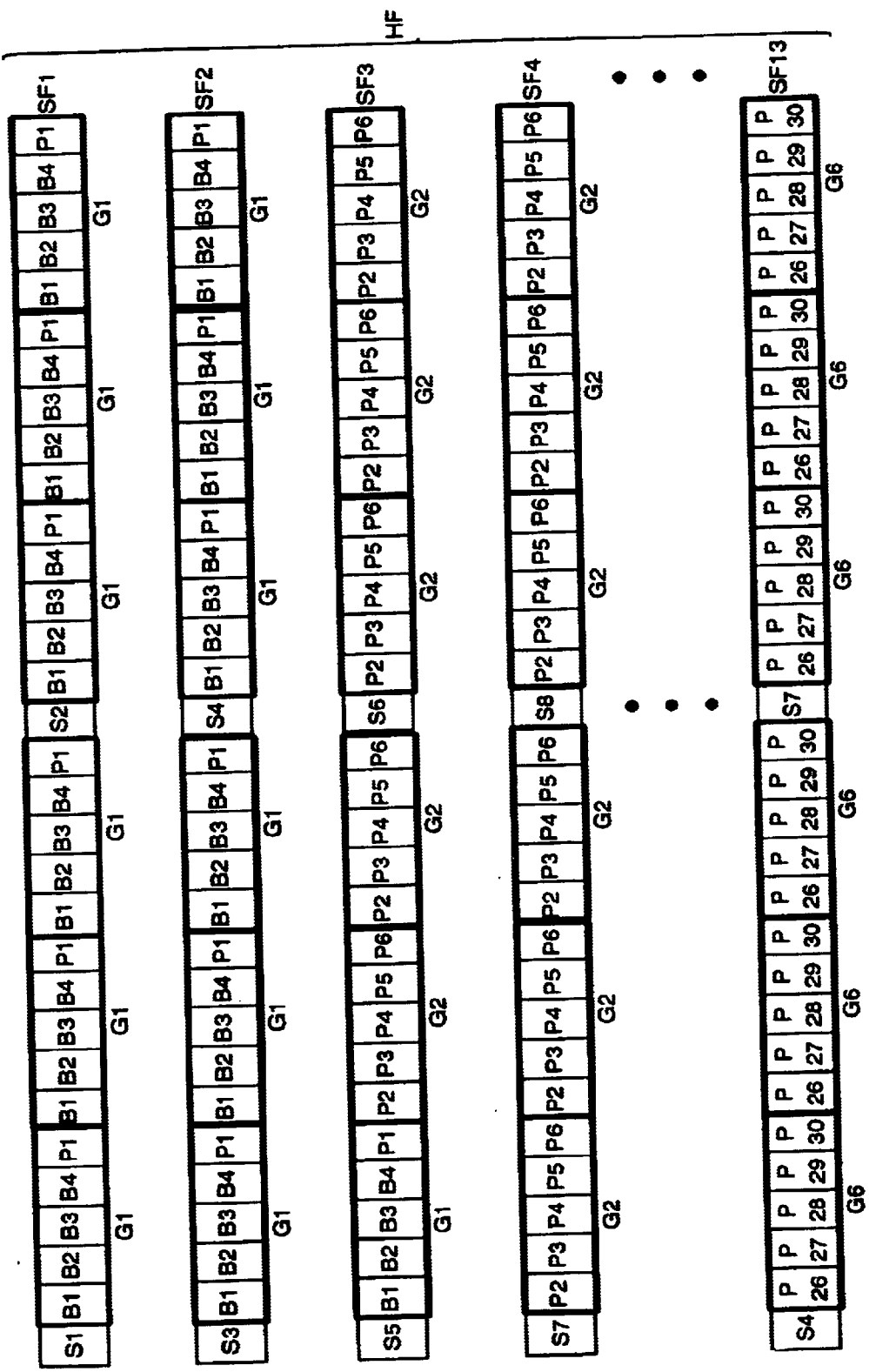

FIGS. 11A and 11B illustrate an example of such a superframe/hyperframe structure for a HP-FDCCH as described in FIG. 9. A hyperframe HF includes a plurality of superframes SF1–SF13, with each superframe SF1–SF13 including 32 frames, each of which is 20 msec. long. The hyperframe HF and superframes SF1–SF13 are defined on sequences of slots on one physical channel, i.e., one repeating time slot on a carrier frequency band (for purposes of illustration, it is assumed that the system operates in full rate mode, i.e., each carrier band is divided into repeating groups of 3 slots, i.e., three physical channels). Hence, each hyperframe HF comprises 32×13 slots=416 slots, 1 slot per 20 msec frame. Of these 416 slots, 26 slots are allocated for synchronization bursts S1–S8, as shown in FIG. 11B. The remaining 390 slots are divided into 6 successive groups G1–G6 of 65 slots each, with the synchronization slots S1–S8 being interspersed among the groups G1–G6.

Within a group G1–G6, the 65 slots are further subdivided into 5 interleaved subchannels, each including 13 slots. A first group G1 is subdivided into slots assigned to first, second, third and fourth broadcast control subchannels B1, B2, B3, B4, and a first paging subchannel P1. A second group G2 is subdivided into slots assigned to second, third, fourth, fifth and sixth paging subchannels P2, P3, P4, P5, P6. Similarly, a sixth group G6 is allocated to twenty-sixth, twenty-seventh, twenty-eighth, twenty-ninth and thirtieth paging subchannels P26, P27, P28, P29, P30.

For ease of reference, the group of 13 slots assigned to a subchannel may be viewed as a "HP-slot," a basic unit that reflects the expansion of an access request or channel reservation status indicator into 13 coded slots. The 13 slots of an HP-slot are spaced in a near uniform fashion, with consecutive slots being separated by 100 msec (except in cases where synchronization bursts are inserted), thus providing time diversity. Inordinate message delay can be avoided, however, as an individual reservation status indicator is transmitted within the duration of one of the groups G1–G6, e.g., within an interval of (without taking into account time for synchronization bursts) approximately 13×5×20 msec=1.3 sec., considerably less than the 8.32 sec. duration of the hyperframe HF.

Figure 12B:
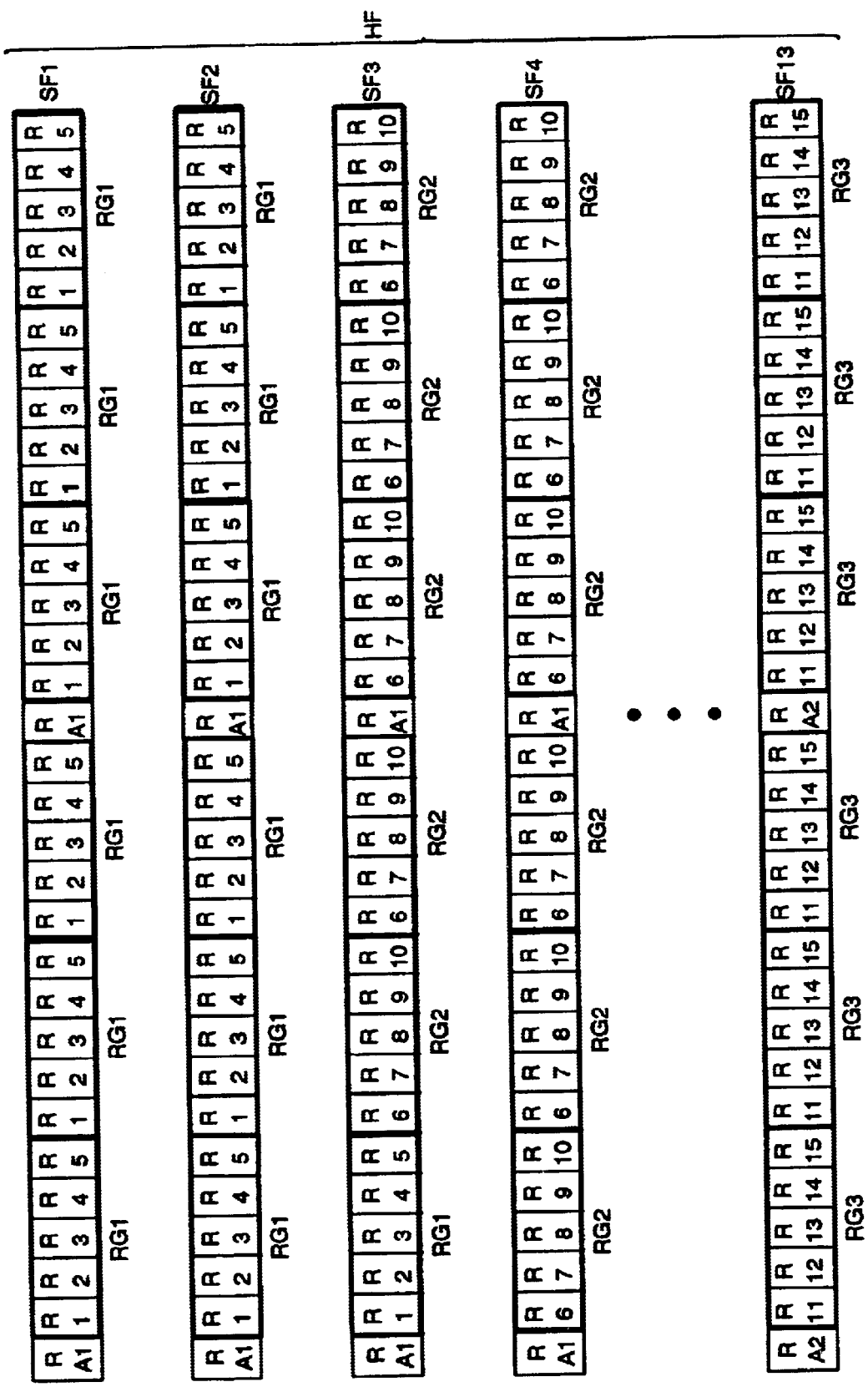
Figure 13:
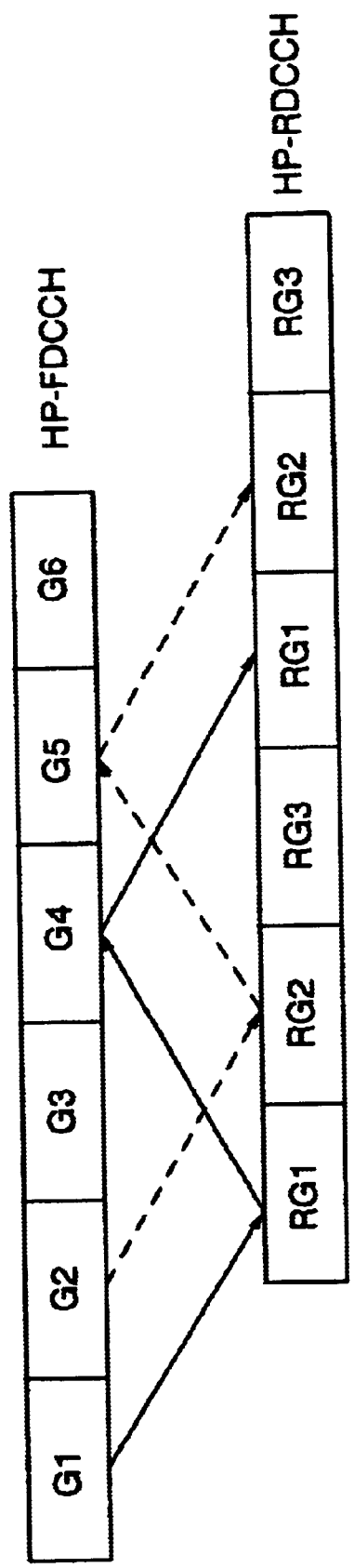
FIG. 13 illustrates subchannelling of high-penetration forward and reverse control channels according to an embodiment of the present invention.

A similar superframe/hyperframe structure is preferably used for the high-penetration reverse control channel, as illustrated in FIGS. 12A and 12B. Instead of six groups, three random access subchannel groups are defined, including a first group RG1 of subchannels R1–R5, a second group RG2 of subchannels R6–R10, and a third group of subchannels R11–R15. With 5 subchannels in each group RG1–RG3, there are 15 total subchannels, each of which occur twice in an 8.32 sec period of a HP-RDCCH hyperframe. The 2 HP-slots utilized for synchronization on the forward link are not required on the reverse link. On the reverse link, these 2 HP-slots may be used for two additional high-penetration random access subchannels RA1, RA2 that are independent of the other 30 subchannels. These additional subchannels may be set up such that the first subchannel RA1 corresponds to the first 13 synchronization slots of the HP-FDCCH, and the second subchannel RA2 corresponds to the second 13 synchronization slots of the HP-FDCCH. The two subchannels RA1, RA2 differ from the other subchannels R1–R15 in that each of these channels require approximately half of the superframe duration (4.15 sec.) to be transmitted and received. The protocol on the additional subchannels RA1, RA2 may be the same as one the other subchannels R1–R15, or these subchannels may be used for other purposes if the additional access request capacity is not required. Transmission on the reverse control channel is preferably delayed with respect to the forward channel such that a dialog like the one illustrated in FIG. 13 can be supported.

Figure 14:
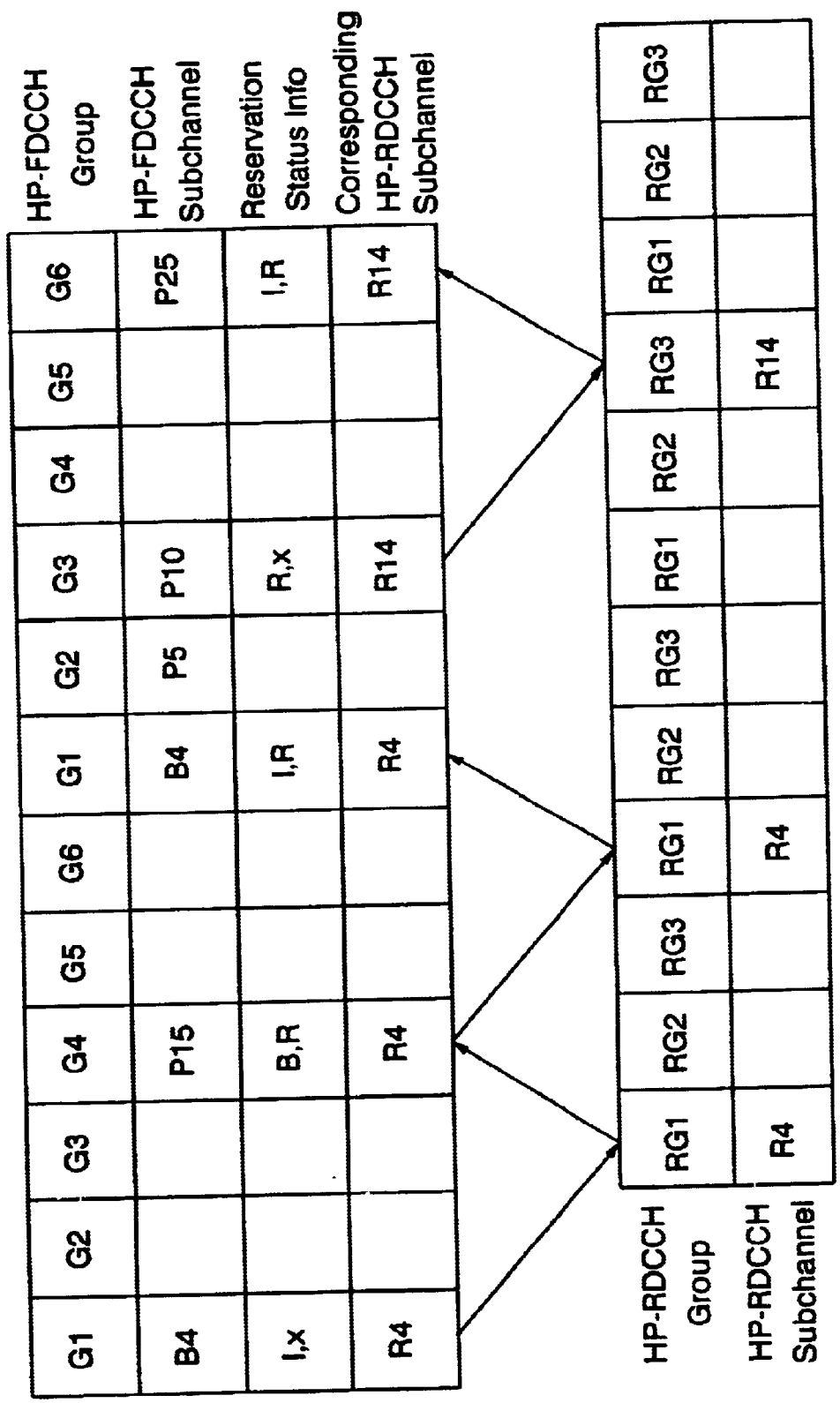
FIG. 14 illustrates exemplary dialog between a mobile terminal and a base station according to an embodiment of the present invention.

FIG. 14 illustrates an exemplary dialog between a mobile terminal and a base station using high-penetration access techniques according to the present invention. A mobile terminal wishing to make a contention-based access scans HP-FDCCH subchannels to find an available channel, eventually reading channel reservation status information transmitted over a broadcast control subchannel B4 that indicates that subchannel R4 in group RG1 is available. The mobile terminal then transmits a access request burst over a random access subchannel R4 of the group RG1. The mobile station then reads the next HP-slot P15 corresponding to the random access subchannel R4, checking to see if the channel reservation status information contained therein identifies the mobile terminal, e.g., includes a portion of the mobile terminal's MSID, indicating receipt of the access request by the base station. The mobile terminal then transmits a second burst on the random access subchannel R4, and then awaits an access response from the base station, for example, an Access Response Channel (ARCH) message transmitted over a forward subchannel P5. The mobile terminal can make a reservation-based access at the discretion of the base station, for example, when the mobile terminal reads reservation status information in a forward subchannel P10 that indicates that a reverse subchannel R14 is reserved for the mobile terminal (e.g., BRI="reserved" and CPE=portion of mobile terminal MSID).

Those skilled in the art will appreciate that numerous alternatives to and variations of the operations of FIGS. 8–14 fall within the scope of the present invention. For example, superframe and hyperframe structures other than those illustrated may be used, such as structures in which a high-penetration subchannel is transmitted on a plurality of consecutive slots, instead of in the interleaved manner illustrated. Subchannel groupings other than those illustrated may also be used. Those skilled in the art will also appreciate that the present invention is also applicable to systems other than the IS-136 compliant system illustrated.

Summarizing aspects of the present invention, random access to a wireless communications system is controlled by transmitting a high-penetration channel reservation status indicator from a base station in a plurality of slots assigned to a high-penetration forward control channel that exhibits increased redundancy over a regular forward control channel through the use of additional coding. The channel reservation status indicator preferably comprises channel reservation status information that is coded according to an error correction code. A block code may be employed such that a respective block code word may be transmitted in a respective one of the plurality of slots, and code words from a received plurality of high-penetration forward channel bursts can be combined to recover the transmitted reservation status information by decoding according to the block code. The high-penetration channel reservation status indicator may be transmitted in response to a high-penetration access request transmitted from a terminal using a similar high-penetration reverse control channel.

According to other aspects of the present invention, special high-penetration channel frame structures may be employed. Respective successive groups of slots of a first physical channel are assigned to respective groups of high-penetration reverse control subchannels, and respective successive groups of slots of a second physical channel are assigned to respective groups of high-penetration forward control subchannels. A high-penetration access request is transmitted as a plurality of bursts in slots assigned to one of the high-penetration reverse control subchannels. A high-penetration reservation status indicator is transmitted as a plurality of burst in slots assigned to a corresponding one of the high-penetration forward control subchannels. High-penetration reverse control subchannels within a group of slots of a first physical channel may be interleaved, and high-penetration forward control subchannels within a group of slots of a second physical channel can be interleaved, thus providing time diversity.

According to another aspect of the present invention, a high-penetration reverse control channel hyperframe is defined, comprising a plurality of high-penetration reverse control channel superframes, a respective one of which includes a plurality of repeating sets of high-penetration reverse subchannel slots. Similarly, a high-penetration forward control channel hyperframe is defined, comprising a plurality of high-penetration forward control channel superframes, a respective one of which includes a plurality of repeating sets of high-penetration forward subchannel slots, interleaved with slots reserved for synchronization bursts. A high-penetration access request may be transmitted as a series of bursts within slots assigned to one of the high-penetration reverse control subchannels such that the access request is transmitted over a time period greater than the duration of one of the high-penetration reverse control channel superframes and less than the duration of the high-penetration reverse control channel hyperframe. Similarly, a high-penetration reservation status indicator can be transmitted as a series of bursts within slots assigned to one of the high-penetration forward control subchannels such that the reservation status indicator is transmitted within a time period that is greater than the duration of one of the high-penetration forward control channel superframes and less than the duration of the high-penetration forward control channel hyperframe.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. In a wireless communications system including at least one base station operative to communicate with one or more terminals over a forward control channel and a reverse control channel, a method of controlling system access comprising the step of:

transmitting a high-penetration channel reservation status indicator from a base station in a plurality of slots assigned to a high-penetration forward control channel, such that the high-penetration channel reservation status indicator has a redundancy greater than that of a channel reservation status indicator transmitted over the forward control channel.

2. A method according to claim 1:

wherein said step of transmitting a high-penetration channel reservation status indicator is preceded by the steps of:

transmitting a high-penetration access request from a terminal in a plurality of slots assigned to a high-penetration reverse control channel, such that the high-penetration access request has a redundancy greater than that of an access request transmitted over the reverse control channel; and receiving the high-penetration access request at the base station; and wherein said step of transmitting a high-penetration channel reservation status indicator comprises the step of transmitting the high-penetration channel reservation status indicator responsive to receipt of the high-penetration access request.

3. A method according to claim 2, wherein the channel reservation status indicator identifies the transmitting terminal.

4. A method according to claim 1:

wherein said step of transmitting a high-penetration channel reservation status indicator comprises the step of transmitting a channel reservation status indicator that indicates whether a selected high-penetration reverse control channel is available;

wherein said step of transmitting a high-penetration channel reservation status indicator is followed by the steps of:

receiving the transmitted high-penetration channel reservation status indicator at a terminal;

transmitting a high-penetration access request from a terminal in a plurality of slots assigned to the high-penetration reverse control channel if the received high-penetration channel reservation status indicator indicates that the selected high-penetration reverse control channel is available;

receiving the transmitted high-penetration access request at the base station; and responsively transmitting a high-penetration channel reservation status indicator identifying the terminal over the high-penetration forward control channel.

5. A method according to claim 1, wherein said step of transmitting a high-penetration channel reservation status indicator is preceded by the step of coding channel reservation status information according to an error correction code, and wherein said step of transmitting a high-penetration channel reservation status indicator comprises the step of transmitting the error correction coded channel reservation status information.

6. A method according to claim 5, wherein said step of coding comprises the step of block coding the channel reservation status information to produce a plurality of coded blocks of channel reservation status information.

7. A method according to claim 6, wherein said step of transmitting a high-penetration channel reservation status indicator comprises the step of transmitting a respective one of the plurality of coded blocks in a respective one of the plurality of slots assigned to the high-penetration forward control channel.

8. A method according to claim 6:

wherein said step of block coding is preceded by the step of convolutionally coding the channel reservation status information; and wherein said step of block coding comprises the step of block coding the convolutionally coded channel reservation status information.

9. A method according to claim 2, further comprising the steps of:

transmitting an access request from the terminal in a slot assigned to the reverse control channel;

receiving the transmitted access request at the base station over the reverse control channel; and responsively transmitting a regular channel reservation status indicator in a corresponding slot assigned to the forward control channel, wherein the access request transmitted over the reverse control channel and the high-penetration access request transmitted over the high-penetration reverse control channel are transmitted at substantially the same power levels, and wherein the channel reservation status indicator transmitted over the forward control channel and the high-penetration channel reservation status indicator transmitted over the high-penetration forward control channel are transmitted at substantially the same power levels.

10. A method according to claim 2, further comprising the steps of:

assigning respective successive groups of slots of a first physical channel to respective groups of high-penetration reverse control subchannels; and assigning respective successive groups of slots of a second physical channel to respective groups of high-penetration forward control subchannels; and wherein said step of transmitting a high-penetration access request comprises the step of transmitting a high-penetration access request as a plurality of bursts in slots assigned to one of the high-penetration reverse control subchannels; and wherein said step of transmitting a high-penetration channel reservation status indicator comprises the step of transmitting a high-penetration channel reservation status indicator as a plurality of burst in slots assigned to a corresponding one of the high-penetration forward control subchannels.

11. A method according to claim 10:

wherein said step of assigning respective successive groups of slots of a first physical channel comprises the step of interleaving a group of high-penetration reverse control subchannels within a group of the groups of slots of the first physical channel; and wherein said step of assigning respective successive groups of slots of a second physical channel comprises the step of interleaving a group of high-penetration forward control subchannels within a group of the groups of slots of the second physical channel.

12. A method according to claim 11, further comprising the steps of:

assigning slots of a group of the groups of slots of the first physical channel to high-penetration reverse subchannels in repeating sets of high-penetration reverse subchannel slots;

assigning slots of a group of the groups of slots of the second physical channel to high-penetration forward subchannels in repeating sets of high-penetration forward subchannel slots;

defining a high-penetration reverse control channel hyperframe comprising a plurality of high-penetration reverse control channel superframes, a respective one of which includes a respective plurality of the repeating sets of high-penetration reverse subchannel slots; and defining a high-penetration forward control channel hyperframe comprising a plurality of high-penetration forward control channel superframes, a respective one of which includes a respective plurality of the repeating sets of high-penetration forward subchannel slots, interleaved with slots reserved for synchronization bursts;

wherein said step of transmitting a high-penetration access request comprises the step of transmitting a series of bursts within slots assigned to one of the high-penetration reverse control subchannels such that the access request is transmitted over a time period greater than the duration of one of the high-penetration reverse control channel superframes and less than the duration of the high-penetration reverse control channel hyperframe; and wherein said step of transmitting a high-penetration channel reservation status indicator comprises the step of transmitting a series of bursts within slots assigned to one of the high-penetration forward control subchannels such that the channel reservation status indicator is transmitted within a time period greater than the duration of one of the high-penetration forward control channel superframes and less than the duration of the high-penetration forward control channel hyperframe.

13. A method according to claim 2, wherein further comprising the step of transmitting an additional message from the terminal to the base station over the high-penetration reverse control channel.

14. In a wireless communications system including at least one base station operative to communicate with one or more terminals over a reverse Digital Control Channel (RDCCH) and a forward Digital Control Channel (FDCCH), a method of controlling access comprising the step of:

transmitting channel reservation status information from a base station as a plurality of error-correction coded bursts in a plurality of slots assigned to a high-penetration forward Digital Control Channel (HP-FDCCH), such that the channel reservation status information transmitted over the HP-FDCCH has a greater redundancy than channel reservation status information transmitted over the FDCCH.

15. A method according to claim 14:

wherein said step of transmitting channel reservation status information is preceded by the steps of:
transmitting an access request from a terminal as a plurality of bursts in a plurality of slots assigned to a high-penetration reverse Digital Control Channel (HP-RDCCH), such that the access request transmitted over the HP-RDCCH has a greater redundancy than an access request transmitted over the RDCCH; and
receiving the transmitted access request at the base station over the HP-RDCCH; and wherein said step of transmitting channel reservation status information comprises the step of transmitting the channel reservation status information in response to receipt of the transmitted access request.

16. A method according to claim 15, wherein the transmitted channel reservation status information identifies the transmitting terminal.

17. A method according to claim 14, wherein said step of transmitting channel reservation status information comprises the step of transmitting channel reservation status information that indicates whether a corresponding high-penetration reverse Digital Control Channel (HP-RDCCH) is idle, busy or reserved.

18. A method according to claim 14, wherein the plurality of error correction coded bursts is coded according to a combination of a convolutional code and a block code.

19. A method according to claim 18, wherein the block code comprises a (32,4) code representing a (16,4) Hadamard code with bit repetition.

20. A method according to claim 18, wherein a respective one of the error correction coded bursts comprises a respective block code word.

21. A method according to claim 14, wherein said step of transmitting channel reservation status information comprises the step of transmitting a plurality of bursts, a respective one of which represents a respective physical layer message that includes a Shared Channel Feedback (SCF) field, such that a combination of the Shared Channel Feedback fields transmitted in the plurality of bursts provides the channel reservation status information.

22. A method according to claim 20, wherein a respective one of the plurality of bursts represents a respective Physical Layer message, and wherein a respective one of the Physical Layer messages comprises an SCF field including a respective one of the block code words.

23. A method according to claim 22, wherein said step of transmitting channel reservation status information is followed the steps of:

receiving the plurality of bursts transmitted in the slots assigned to the HP-FDCCH at the terminal;
processing the received bursts to recover a plurality of received physical layer messages; and
decoding SCF fields of the received physical layer messages to recover channel reservation status information.

24. A method according to claim 15, further comprising the steps of:

transmitting an access request burst from the terminal in a slot assigned to the RDCCH; and
transmitting a channel reservation status information burst in a corresponding slot assigned to the FDCCH,
wherein the access request bursts transmitted over the RDCCH and the HP-RDCCH are transmitted at substantially the same power levels, and wherein the channel reservation status information bursts transmitted over the FDCCH and the HP-FDCCH are transmitted at substantially the same power levels.

25. A method according to claim 15, further comprising the steps of:

assigning respective successive groups of slots of a first physical channel to respective groups of HP-RDCCH subchannels, a respective one of the HP-RDCCH subchannels having a respective plurality of slots assigned thereto; and assigning respective successive groups of slots of a second physical channel to respective groups of HP-FDCCH subchannels, a respective one of the HP-FDCCH subchannels having a respective plurality of slots assigned thereto;

wherein said step of transmitting an access request comprises the step of transmitting a plurality of access request bursts over one of the HP-RDCCH subchannels; and wherein said step of transmitting channel reservation status information comprises the step of transmitting a plurality of channel reservation status information bursts in a corresponding one of the HP-FDCCH subchannels.

26. A method according to claim 25:

wherein said step of assigning respective successive groups of slots of a first physical channel comprises the step of interleaving a group of HP-RDCCH subchannels within a group of the groups of slots of the first physical channel; and wherein said step of assigning respective successive groups of slots of a second physical channel comprises the step of interleaving a group of HP-FDCCH subchannels within a group of the groups of slots of the second physical channel.

27. A method according to claim 25, further comprising the steps of:

assigning slots of a group of the groups of slots of the first physical channel to high-penetration reverse subchannels in repeating sets;

assigning slots of a group of the groups of slots of the second physical channel to high-penetration forward subchannels in repeating sets;

defining a HP-RDCCH channel hyperframe comprising a plurality of HP-RDCCH channel superframes, a respective one of which includes a respective plurality of the repeating sets of high-penetration reverse subchannel slots;

defining a HP-FDCCH channel hyperframe comprising a plurality of HP-FDCCH channel superframes, a respective one of which includes a respective plurality of the repeating sets of high-penetration forward subchannel slots, interleaved with slots reserved for synchronization bursts; and wherein said step of transmitting an access request comprises the step of transmitting a series of bursts within slots assigned to one of the HP-RDCCH subchannels such that the access request is transmitted over a time period greater than the duration of one of the HP-RDCCH channel superframes and less than the duration of the HP-RDCCH channel hyperframe; and wherein said step of transmitting channel reservation status information comprises the step of transmitting a series of bursts within slots assigned to one of the HP-FDCCH subchannels such that the channel reservation status information is transmitted within a time period greater than the duration of one of the HP-FDCCH channel superframes and less than the duration of the HP-FDCCH channel hyperframe.

28. A base station operative to communicate with terminals over a forward control channel and a reverse control channel, the base station comprising:

a receiver operative to receive an access request in a slot assigned to the reverse control channel and to receive a high-penetration access request from a terminal in a plurality of slots assigned to a high-penetration reverse control channel, such that the high-penetration access request has a redundancy greater than that of an access request transmitted over the reverse control channel; and a transmitter operative to transmit a channel reservation status indicator in a slot assigned to the forward control channel and to transmit a high-penetration channel reservation status indicator in a plurality of slots assigned to a high-penetration forward control channel, such that the high-penetration channel reservation status indicator has a redundancy greater than that of a channel reservation status indicator transmitted over the forward control channel.

29. A base station according to claim 28, wherein said transmitter is responsive to said receiver to transmit a high-penetration channel reservation status indicator in response to receipt of a high-penetration access request.

30. A base station according to claim 28, further comprising an error correction coder operative to code channel reservation status information according to an error correction code, and wherein said transmitter is responsive to said error correction coder to transmit the error correction coded channel reservation status information over the high-penetration forward control channel.

31. A base station according to claim 30, wherein said error correction coder comprises a block coder.

32. A base station according to claim 31, wherein said transmitter is operative to transmit a respective one of a plurality of coded blocks of channel reservation status information in a respective one of the plurality of slots assigned to the high-penetration forward control channel.

33. A base station according to claim 31, wherein said error correction coder further comprises a convolutional coder.

34. A base station according to claim 28, wherein said transmitter is operative to transmit channel reservation status indicators over the forward control channel and the high-penetration forward control channel at substantially the same power levels.

35. A base station according to claim 28, wherein respective successive groups of slots of a first physical channel are assigned to respective groups of high-penetration reverse control subchannels, wherein respective successive groups of slots of a second physical channel are assigned to respective groups of high-penetration forward control subchannels, and:

wherein said transmitter is operative to transmit a high-penetration channel reservation status indicator as a plurality of burst in slots assigned to a high-penetration forward control subchannel; and wherein said receiver is operative to receive a high-penetration access request as a plurality of bursts in slots assigned to a high-penetration reverse control subchannel.

36. A base station according to claim 28, wherein slots of a group of the groups of slots of the first physical channel are assigned to high-penetration reverse subchannels in repeating sets of high-penetration reverse subchannel slots, wherein slots of a group of the groups of slots of the second physical channel are assigned to high-penetration forward subchannels in repeating sets of high-penetration forward subchannel slots, wherein a high-penetration reverse control channel hyper-frame comprises a plurality of high-penetration reverse control channel superframes, a respective one of which includes a respective plurality of the repeating sets of high-penetration reverse subchannel slots, wherein a high-penetration forward control channel hyper-frame comprises a plurality of high-penetration forward control channel superframes, a respective one of which includes a respective plurality of the repeating sets of high-penetration forward subchannel slots, interleaved with slots reserved for synchronization bursts, and:

wherein said receiver is operative to receive a series of bursts within slots assigned to one of the high-penetration reverse control subchannels such that the access request is received over a time period greater than the duration of one of the high-penetration reverse control channel superframes and less than the duration of the high-penetration reverse control channel hyperframe; and wherein said transmitter is operative to transmit a series of bursts within slots assigned to one of the high-penetration forward control subchannels such that the channel reservation status indicator is transmitted within a time period greater than the duration of one of the high-penetration forward control channel superframes and less than the duration of the high-penetration forward control channel hyperframe.

37. A base station operative to communicate with terminals over a reverse Digital Control Channel (RDCCH) and a forward Digital Control Channel (FDCCH) mapped thereon, the base station comprising:

a receiver operative to receive an access request as a burst in a slot assigned to the RDCCH and to receive an access request as a plurality of bursts in a plurality of slots assigned to a high-penetration reverse Digital Control Channel (HP-RDCCH), such that the access request received over the HP-RDCCH has a greater redundancy than an access request received over the RDCCH; and a transmitter operative to transmit channel reservation status information as a burst in a slot assigned to the FDCCH and to transmit channel reservation status information as a plurality of error-correction coded bursts in a plurality of slots assigned to a high-penetration forward Digital Control Channel (HP-FDCCH), such that the channel reservation status information transmitted over the HP-FDCCH has a greater redundancy than channel reservation status information transmitted over the FDCCH.

38. A base station according to claim 37, wherein said transmitter is responsive to said receiver to transmit channel reservation status information over the HP-FDCCH in response to receipt of an access request over the HP-RDCCH.

39. A base station according to claim 37, wherein said transmitter is operative to transmit channel reservation status information over the HP-FDCCH that indicates whether a corresponding HP-RDCCH is idle, busy or reserved.

40. A base station according to claim 37, further comprising a error correction coder operative to code channel reservation status information according to a combination of a convolutional code and a block code, and wherein said transmitter is operative to transmit the convolutionally and block coded channel reservation status information over the FDCCH.

41. A base station according to claim 40, wherein the block code comprises a (32, 4) code representing a (16,4) Hadamard code with bit repetition.

42. A base station according to claim 37, wherein said transmitter is operative to transit a plurality of bursts in slot assigned to the HP-FDCCH, a respective one of which represents a respective physical layer message that includes a Shared Channel Feedback (SCF) field, such that a combination of the Shared Channel Feedback fields transmitted in the plurality of bursts provides the channel reservation status information.

43. A base station according to claim 40, wherein a respective one of the plurality of bursts represents a respective Physical Layer message, and wherein a respective one of the Physical Layer messages comprises an SCF field including a respective block code word.

44. A base station according to claim 37, wherein respective successive groups of slots of a first physical channel are assigned to respective groups of HP-RDCCH subchannels, a respective one of the HP-RDCCH subchannels having a respective plurality of slots assigned thereto, wherein respective successive groups of slots of a second physical channel are assigned to respective groups of HP-FDCCH subchannels, a respective one of the HP-FDCCH subchannels having a respective plurality of slots assigned thereto, and:
   wherein said receiver is operative to receive a plurality of access request bursts over one of the HP-RDCCH subchannels; and
   wherein said transmitter is operative to transmit a plurality of channel reservation status information bursts in a corresponding one of the HP-FDCCH subchannels.

45. A base station according to claim 44, wherein slots of a group of the groups of slots of the first physical channel are assigned to high-penetration reverse subchannels in repeating sets, wherein slots of a group of the groups of slots of the second physical channel are assigned to high-penetration forward subchannels in repeating sets, wherein a HP-RDCCH channel hyperframe comprises a plurality of HP-RDCCH channel superframes, a respective one of which includes a respective plurality of the repeating sets of high-penetration reverse subchannel slots, wherein a HP-FDCCH channel hyperframe comprises a plurality of HP-FDCCH channel superframes, a respective one of which includes a respective plurality of the repeating sets of high-penetration forward subchannel slots, interleaved with slots reserved for synchronization bursts, and:
   wherein said receiver is operative to receive a series of bursts within slots assigned to one of the HP-RDCCH subchannels such that the access request is received over a time period greater than the duration of one of the HP-RDCCH channel superframes and less than the duration of the HP-RDCCH channel hyperframe; and
   wherein said transmitter is operative to transmit a series of bursts within slots assigned to one of the HP-FDCCH subchannels such that the channel reservation status information is transmitted within a time period greater than the duration of one of the HP-FDCCH channel superframes and less than the duration of the HP-FDCCH channel hyperframe.

46. A terminal operative to communicate with a base station over a forward control channel and a reverse control channel, the terminal comprising:
   a receiver operative to receive a channel reservation status indicator in a slot assigned to the forward control channel and to receive a high-penetration channel reservation status indicator in a plurality of slots assigned to a high-penetration forward control channel, such that the high-penetration channel reservation status indicator has a redundancy greater than that of a channel reservation status indicator received over the forward control channel; and
   a transmitter operative to transmit an access request in a slot assigned to the reverse control channel and to transmit a high-penetration access request in a plurality of slots assigned to a high-penetration reverse control channel, such that the high-penetration access request has a redundancy greater than that of an access request transmitted over the reverse control channel.

47. A terminal according to claim 46, wherein said transmitter is responsive to said receiver to transmit an access request of the high-penetration reverse control channel in response to channel reservation status information received over the high-penetration forward control channel.

48. A terminal according to claim 46, further comprising a error correction decoder operative to decode channel reservation status information received over the high-penetration forward control channel.

49. A terminal according to claim 48, wherein said error correction decoder comprises a block decoder.

50. A terminal according to claim 49, wherein said receiver is operative to receive a respective coded blocks of channel reservation status information in a respective one of the plurality of slots assigned to the high-penetration forward control channel, and wherein said block decoder is operative to block decode the coded blocks of channel reservation status information.

51. A terminal according to claim 49, further comprising a convolutional decoder responsive to said block decoder and operative to convolutionally decode block decoded channel reservation status information.

52. A terminal according to claim 47, wherein said transmitter is operative to transmit access requests over the reverse control channel and the high-penetration reverse control channel at substantially the same power levels.

53. A terminal according to claim 47, wherein respective successive groups of slots of a first physical channel are assigned to respective groups of high-penetration reverse control subchannels, wherein respective successive groups of slots of a second physical channel are assigned to respective groups of high-penetration forward control subchannels, and:
   wherein said transmitter is operative to transmit a high-penetration access request as a plurality of bursts in slots assigned to one of the high-penetration reverse control subchannels; and
   wherein said receiver is operative to receive a high-penetration channel reservation status indicator as a plurality of burst in slots assigned to a corresponding one of the high-penetration forward control subchannels.

54. A terminal according to claim 53, wherein slots of a group of the groups of slots of the first physical channel are assigned to high-penetration reverse subchannels in repeating sets of high-penetration reverse subchannel slots, wherein slots of a group of the groups of slots of the second physical channel are assigned to high-penetration forward subchannels in repeating sets of high-penetration forward subchannel slots, wherein a high-penetration reverse control channel hyperframe comprises a plurality of high-penetration reverse control channel superframes, a respective one of which includes a respective plurality of the repeating sets of high-penetration reverse subchannel slots, wherein a high-penetration forward control channel hyperframe comprises a plurality of high-penetration forward control channel superframes, a respective one of which includes a respective plurality of the repeating sets of high-penetration forward subchannel slots, interleaved with slots reserved for synchronization bursts, and:

wherein said transmitter is operative to transmit a series of bursts within slots assigned to one of the high-penetration reverse control subchannels such that an access request is transmitted over a time period greater than the duration of one of the high-penetration reverse control channel superframes and less than the duration of the high-penetration reverse control channel hyperframe; and wherein said receiver is operative to receive a series of bursts within slots assigned to one of the high-penetration forward control subchannels such that a channel reservation status indicator is received within a time period greater than the duration of one of the high-penetration forward control channel superframes and less than the duration of the high-penetration forward control channel hyperframe.

55. A terminal operative to communicate with a base station over a reverse Digital Control Channel (RDCCH) and a forward Digital Control Channel (FDCCH) mapped thereon, the terminal comprising:

a receiver operative to receive channel reservation status information as a plurality of error-correction coded bursts in a plurality of slots assigned to a high-penetration forward Digital Control Channel (HP-FDCCH), such that the channel reservation status information received over the HP-FDCCH has a greater redundancy than channel reservation status information received over the FDCCH; and a transmitter operative to transmit an access request as a plurality of bursts in a plurality of slots assigned to a high-penetration reverse Digital Control Channel (HP-RDCCH), such that the access request transmitted over the HP-RDCCH has a greater redundancy than an access request transmitted over the RDCCH.

56. A terminal according to claim 55, wherein said transmitter is responsive to said receiver to transmit an access request over the HP-RDCCH when channel reservation status information received over the HP-FDCCH indicates that the RDCCH is available.

57. A terminal according to claim 55, wherein the plurality of error correction coded bursts is coded according to a combination of a convolutional code and a block code.

58. A terminal according to claim 57, wherein the block code comprises a (32,4) code representing a (16,4) Hadamard code with bit repetition.

59. A terminal according to claim 57, wherein a respective one of the error correction coded bursts comprises a respective block code word.

60. A terminal according to claim 55, wherein said receiver is operative to receive a plurality of bursts over the HP-FDCCH, a respective one of which represents a respective physical layer message that includes a Shared Channel Feedback (SCF) field, such that a combination of the Shared Channel Feedback fields transmitted in the plurality of bursts provides channel reservation status information.

61. A terminal according to claim 60, wherein a respective one of the plurality of bursts represents a respective Physical Layer message, and wherein a respective one of the Physical Layer messages comprises an SCF field including a respective block code word.

62. A terminal according to claim 61, further comprising a block decoder operative to decode the block code words to recover channel reservation status information.

63. A terminal according to claim 61, wherein said transmitter is operative to transmit access request bursts over the RDCCH and the HP-RDCCH at substantially the same power levels.

64. A terminal according to claim 55, wherein respective successive groups of slots of a first physical channel are assigned to respective groups of HP-RDCCH subchannels, a respective one of the HP-RDCCH subchannels having a respective plurality of slots assigned thereto, wherein respective successive groups of slots of a second physical channel are assigned to respective groups of HP-FDCCH subchannels, a respective one of the HP-FDCCH subchannels having a respective plurality of slots assigned thereto, and:

wherein said transmitter is operative to transmit a plurality of access request bursts over one of the HP-RDCCH subchannels; and wherein said receiver is operative to receive a plurality of channel reservation status information bursts in a corresponding one of the HP-FDCCH subchannels.

65. A terminal according to claim 64, wherein slots of a group of the groups of slots of the first physical channel are assigned to high-penetration reverse subchannels in repeating sets, wherein slots of a group of the groups of slots of the second physical channel are assigned to high-penetration forward subchannels in repeating sets, wherein a HP-RDCCH channel hyperframe comprises a plurality of HP-RDCCH channel superframes, a respective one of which includes a respective plurality of the repeating sets of high-penetration reverse subchannel slots, wherein a HP-FDCCH channel hyperframe comprises a plurality of HP-FDCCH channel superframes, a respective one of which includes a respective plurality of the repeating sets of high-penetration forward subchannel slots, interleaved with slots reserved for synchronization bursts, and:

wherein said transmitter is operative to transmit a series of bursts within slots assigned to one of the HP-RDCCH subchannels such that an access request is transmitted over a time period greater than the duration of one of the HP-RDCCH channel superframes and less than the duration of the HP-RDCCH channel hyperframe; and wherein said receiver is operative to receive a series of bursts within slots assigned to one of the HP-FDCCH subchannels such that channel reservation status information is received within a time period greater than the duration of one of the HP-FDCCH channel superframes and less than the duration of the HP-FDCCH channel hyperframe.

* * * * *